(12) United States Patent
Uemura et al.

(10) Patent No.: US 11,368,118 B2
(45) Date of Patent: Jun. 21, 2022

(54) MOTOR DRIVING DEVICE AND AIR CONDITIONER

(71) Applicant: Mitsubishi Electric Corporation, Tokyo (JP)

(72) Inventors: Keisuke Uemura, Tokyo (JP); Takashi Yamakawa, Tokyo (JP); Kenji Iwazaki, Tokyo (JP); Koichi Arisawa, Tokyo (JP); Atsushi Tsuchiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/334,379

(22) PCT Filed: Oct. 31, 2016

(86) PCT No.: PCT/JP2016/082204
§ 371 (c)(1),
(2) Date: Mar. 19, 2019

(87) PCT Pub. No.: WO2018/078839
PCT Pub. Date: May 3, 2018

(65) Prior Publication Data
US 2020/0021225 A1 Jan. 16, 2020

(51) Int. Cl.
*H02P 27/06* (2006.01)
*F24F 11/74* (2018.01)
(Continued)

(52) U.S. Cl.
CPC .............. *H02P 27/06* (2013.01); *F24F 11/46* (2018.01); *F24F 11/74* (2018.01); *F25B 31/026* (2013.01);
(Continued)

(58) Field of Classification Search
CPC ......... F24F 11/46; F24F 11/74; F25B 31/026; F25B 49/025; H02K 5/225; H02P 21/02; H02P 25/184; H02P 27/06
(Continued)

(56) References Cited

U.S. PATENT DOCUMENTS 5,675,222 A * 10/1997 Fliege ..................... B60L 3/003
                                                          318/139
5,760,567 A *  6/1998 Nakamura .............. H02P 25/20
                                                          318/777
(Continued)

FOREIGN PATENT DOCUMENTS

CA  WO-2016/015147  *  2/2016  .............. H02P 27/00
JP  S57-180582 A      11/1982
(Continued)

OTHER PUBLICATIONS

Office Action dated Mar. 31, 2020 issued in corresponding JP patent application No. 2018-547066 (and English translation).
(Continued)

*Primary Examiner* — Muhammad S Islam
*Assistant Examiner* — Zemenay T Truneh
(74) *Attorney, Agent, or Firm* — Posz Law Group, PLC

(57) ABSTRACT

A motor driving device that is a device for driving a motor including stator windings, includes: a connection switching unit that includes relays as mechanical switches connected to the stator windings and excitation coils opening or closing the relays by being energized or non-energized with excitation current and switches connection condition of the stator windings to either of first connection condition (star connection) and second connection condition (delta connection) different from the first connection condition by opening or closing the relays; and an inverter that supplies AC drive voltages to the stator windings.

7 Claims, 12 Drawing Sheets

(51) Int. Cl.
 *F24F 11/46* (2018.01)
 *F25B 31/02* (2006.01)
 *F25B 49/02* (2006.01)
 *H02K 5/22* (2006.01)
 *H02P 6/08* (2016.01)

(52) U.S. Cl.
 CPC ........... *F25B 49/025* (2013.01); *H02K 5/225* (2013.01); *H02P 6/08* (2013.01)

(58) Field of Classification Search
 USPC ............................................ 318/495; 29/598
 See application file for complete search history.

(56) References Cited

U.S. PATENT DOCUMENTS

| | | | | |
|---|---|---|---|---|
| 6,493,924 | B2* | 12/2002 | Das ........................... | H02P 6/08 29/598 |
| 6,680,997 | B2* | 1/2004 | Das ........................... | H02P 6/08 318/400.09 |
| 2002/0067093 | A1 | 6/2002 | Das | |
| 2004/0217723 | A1* | 11/2004 | Cai ..................... | F02N 11/0866 318/268 |
| 2014/0132197 | A1* | 5/2014 | Kanazawa ............. | H02K 11/33 318/724 |
| 2015/0168033 | A1* | 6/2015 | Yamakawa ............. | F25B 30/02 62/324.6 |
| 2016/0361975 | A1* | 12/2016 | Blatchley ............. | B60H 1/3214 |

FOREIGN PATENT DOCUMENTS

| | | | | |
|---|---|---|---|---|
| JP | S60-033574 | U | 3/1985 | |
| JP | 63206195 | * | 8/1988 | |
| JP | S63-234885 | A | 9/1988 | |
| JP | H01-094856 | U | 6/1989 | |
| JP | H04-355697 | A | 12/1992 | |
| JP | H10-080152 | A | 3/1998 | |
| JP | 2000-121768 | A | 4/2000 | |
| JP | 2009-216324 | * | 1/2006 | .............. F24F 11/02 |
| JP | 2006-246674 | A | 9/2006 | |
| JP | 2008-228513 | A | 9/2008 | |
| JP | 2009-216324 | A | 9/2009 | |
| JP | 2013-028877 | A | 2/2013 | |
| KR | 2002-0034760 | A | 5/2002 | |
| WO | 2009/070089 | A1 | 6/2009 | |
| WO | 2016/015147 | A1 | 2/2016 | |

OTHER PUBLICATIONS

Office Action dated Nov. 26, 2019 issued in corresponding JP patent application No. 2018-547066 (and English translation).
Extended European Search Report dated Jul. 8, 2019 issued in corresponding EP patent application No. 16919633.4.
Reconsideration Report dated Jun. 29, 2020 issued in corresponding JP patent application No. 2018-547066 (and English translation).
International Search Report of the International Searching Authority dated Jan. 24, 2017 for the corresponding International application No. PCT/JP2016/082204 (and English translation).
Korean Notice of Final Rejection dated Apr. 29, 2021, issued in corresponding Korean Patent Applcation No. 10-2019-7007907 (and English Machine Translation).
Office Action dated Oct. 13, 2020 issued in corresponding to Korean patent application No. 10-2019-7007907 (and English machine translation).
European Office Action dated Jan. 28, 2021, issued in corresponding EP Patent Application No. 16919633.4.
Office Action dated Nov. 18, 2021, issued in corresponding CN Patent Application No. 201680090055.3 (and English Machine Translation).

\* cited by examiner

U-PHASE COIL

V-PHASE COIL

W-PHASE COIL

U-PHASE COIL

V-PHASE COIL

W-PHASE COIL

FIG. 8

| OPEN/CLOSED STATES OF RELAYS 31, 32 AND 33 | | | | | | CONN-ECTION MODE |
|---|---|---|---|---|---|---|
| 31a-31c | 31b-31c | 32a-32c | 32b-32c | 33a-33c | 33b-33c | |
| CLOSED (51a: EXCITED) | OPEN (51a: EXCITED) | CLOSED (52a: EXCITED) | OPEN (52a: EXCITED) | CLOSED (53a: EXCITED) | OPEN (53a: EXCITED) | DELTA CONN-ECTION FIG. 7(B) |
| OPEN (51a: NON-EXCITED) | CLOSED (51a: NON-EXCITED) | OPEN (52a: NON-EXCITED) | CLOSED (52a: NON-EXCITED) | OPEN (53a: NON-EXCITED) | CLOSED (53a: NON-EXCITED) | STAR CONN-ECTION FIG. 7(A) |

| OPEN/CLOSED STATES OF RELAYS 41 TO 46 | | | | | | CONN-ECTION MODE |
|---|---|---|---|---|---|---|
| 41a – 41b | 42a – 42b | 43a – 43b | 44a – 44b | 45a – 45b | 46a – 46b | |
| CLOSED (61a: EXCITED) | OPEN (62a: EXCITED) | CLOSED (63a: EXCITED) | OPEN (64a: EXCITED) | CLOSED (65a: EXCITED) | OPEN (66a: EXCITED) | DELTA CONN-ECTION FIGS. 12(A), 12(B) |
| OPEN (61a: NON-EXCITED) | CLOSED (62a NON-: EXCITED) | OPEN (63a: NON-EXCITED) | CLOSED (64a NON- EXCITED) | OPEN (65a: NON-EXCITED) | CLOSED (66a NON- EXCITED) | STAR CONN-ECTION FIGS. 11(A), 11(B) |

MOTOR DRIVING DEVICE AND AIR CONDITIONER

CROSS REFERENCE TO RELATED APPLICATION

This application is a U.S. national stage application of International Patent Application No. PCT/JP2016/082204 filed on Oct. 31, 2016, the disclosure of which is incorporated herein by reference.

TECHNICAL FIELD

The present invention relates to a motor driving device for driving a motor and to an air conditioner including a motor driving device for driving a motor for a compressor.

BACKGROUND

Cooling capacity and heating capacity of an air conditioner (A/C) can be adjusted by changing rotational speed of a motor for a compressor. For example, at startup of the air conditioner, a quick cooling operation or a quick heating operation is performed by making the motor rotate at high speed, and after the room temperature has reached a requested temperature, an energy-saving operation is performed by making the motor rotate at low speed. Since the time of the energy-saving operation is generally long, using a motor having high efficiency in low speed rotation is desirable for reducing the annual electric energy consumption. Further, to raise the maximum capacity of cooling and heating, it is desirable to use a motor capable of high speed rotation.

As the motor for a compressor, permanent magnet motors including a permanent magnet in the rotor are widely used in order to increase the efficiency. As a device for driving a motor, motor driving devices including an inverter have become widespread. In a permanent magnet motor, increasing the number of turns of a stator winding enables operation with a smaller amount of current, decreases inverter loss due to the current, and enables operation with higher efficiency. However, increasing the number of turns of the stator winding leads to a rise in inductive voltage, and thus motor voltage ruled by the inductive voltage reaches the maximum output voltage of the inverter at a low rotational speed and operation at higher rotational speeds is impossible.

In contrast, decreasing the number of turns of the stator winding lowers the inductive voltage, and thus the motor voltage ruled by the inductive voltage hardly reaches the maximum output voltage of the inverter and the motor can be operated in high speed rotation. However, decreasing the number of turns of the stator winding increases the current flowing into the stator winding, and thus the inverter loss due to the current increases and operation with high efficiency becomes impossible.

As above, permanent magnet motors with high efficiency in low speed rotation cannot be operated in high speed rotation, and permanent magnet motors that can be operated in high speed rotation are low in the efficiency in low speed rotation. To eliminate this problem, there has been proposed a motor driving device including a connection switching unit that switches stator windings of a motor receiving drive voltage supplied from an inverter between star connection and delta connection (see Patent Reference 1, for example).

PATENT REFERENCE

Patent Reference 1: Japanese Patent Application Publication No. 2006-246674 (claim 1, paragraphs 0016 to 0020 and 0047 to 0048, FIG. 1, FIG. 2 and FIG. 7)

However, in the motor driving device described in the Patent Reference 1, electric power consumption necessary for maintaining the status of mechanical switches of the connection switching unit is not taken into consideration and there are cases where efficiency improvement is insufficient especially in low speed rotation whose operating time is long.

SUMMARY

The object of the present invention is to provide a motor driving device capable of driving a motor in high speed rotation and driving the motor with high efficiency in low speed rotation and an air conditioner capable of achieving both of high cooling/heating capacity and operation with great energy saving effect.

A motor driving device according to an aspect of the present invention is a motor driving device for driving a motor including stator windings, including: a connection switching unit that includes a mechanical switch connected to the stator windings and an excitation coil opening or closing the mechanical switch by being energized or non-energized with excitation current and switches connection condition of the stator windings to either of first connection condition and second connection condition different from the first connection condition by opening or closing the mechanical switch; and an inverter that supplies AC drive voltages to the stator windings.

An air conditioner according to an aspect of the present invention is an air conditioner including a motor including stator windings, a compressor driven by the motor, and a motor driving device that drives the motor. The motor driving device includes: a connection switching unit that includes a mechanical switch connected to the stator windings and an excitation coil opening or closing the mechanical switch by being energized or non-energized with excitation current and switches connection condition of the stator windings to either of first connection condition and second connection condition different from the first connection condition by opening or closing the mechanical switch; and an inverter that supplies AC drive voltages to the stator windings.

With the motor driving device according to the present invention, the connection condition of the stator windings can be switched appropriately by the opening or closing of the mechanical switch, and thus the motor can be driven in high speed rotation, and the motor can be driven with high efficiency in low speed rotation.

Further, with the motor driving device according to the present invention, the electric power consumption can be reduced by appropriately controlling the energization of the excitation coil opening or closing the mechanical switch, by which energy saving performance can be improved.

Furthermore, the air conditioner according to the present invention includes the motor driving device described above, and thus it is possible to achieve both of the high cooling/heating capacity due to high speed rotation of the motor for the compressor and the energy-saving operation of the motor for the compressor.

BRIEF DESCRIPTION OF THE DRAWINGS

FIG. 8 is a diagram showing an example of open/closed states of the relays in the connection switching unit shown in FIGS. 7(A) and 7(B) in a tabular form.

DETAILED DESCRIPTION (1) First Embodiment

Figure 1:
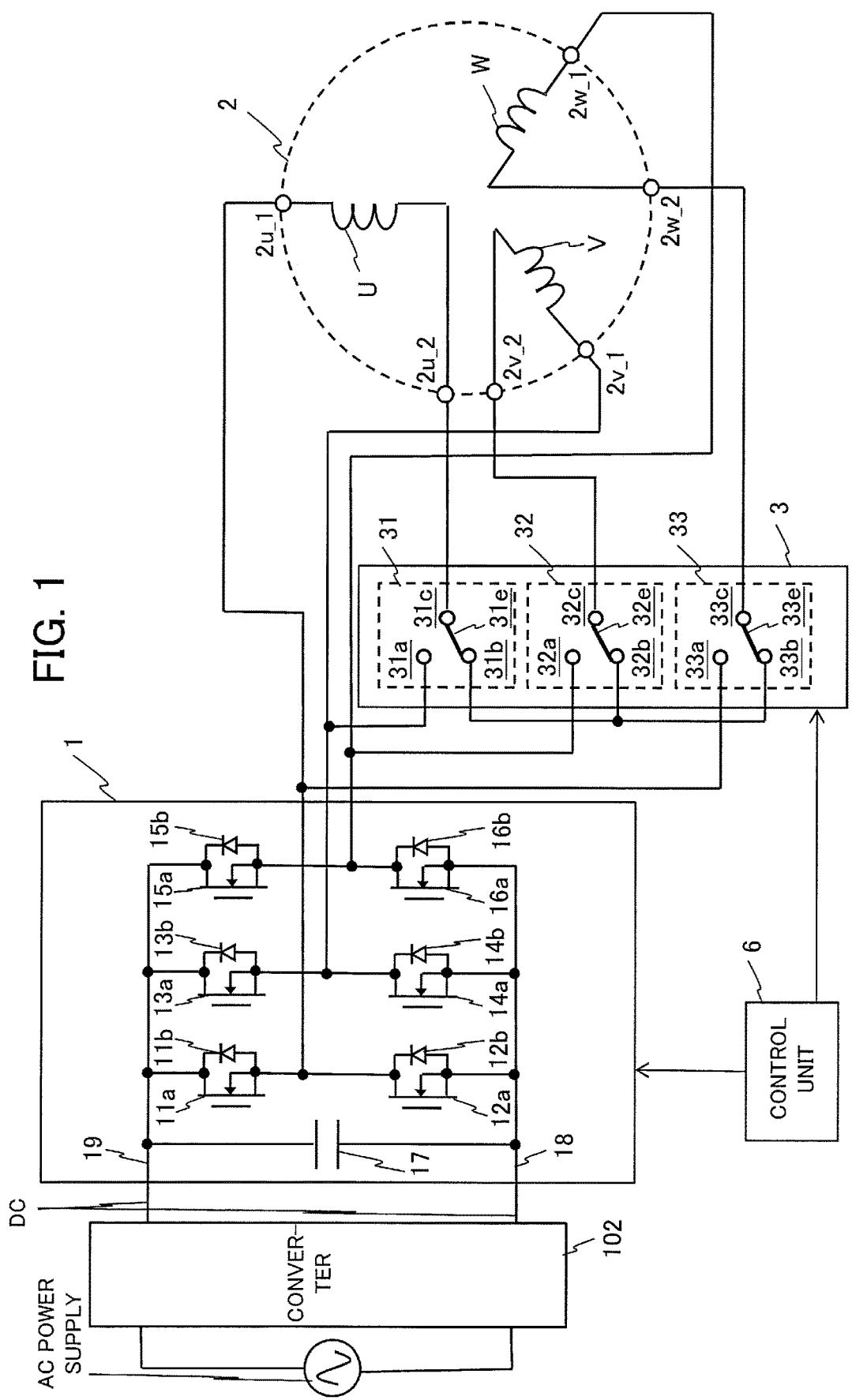
FIG. 1 is a diagram schematically showing a configuration of a motor driving device according to a first embodiment of the present invention (in a case of star connection).
Figure 2:
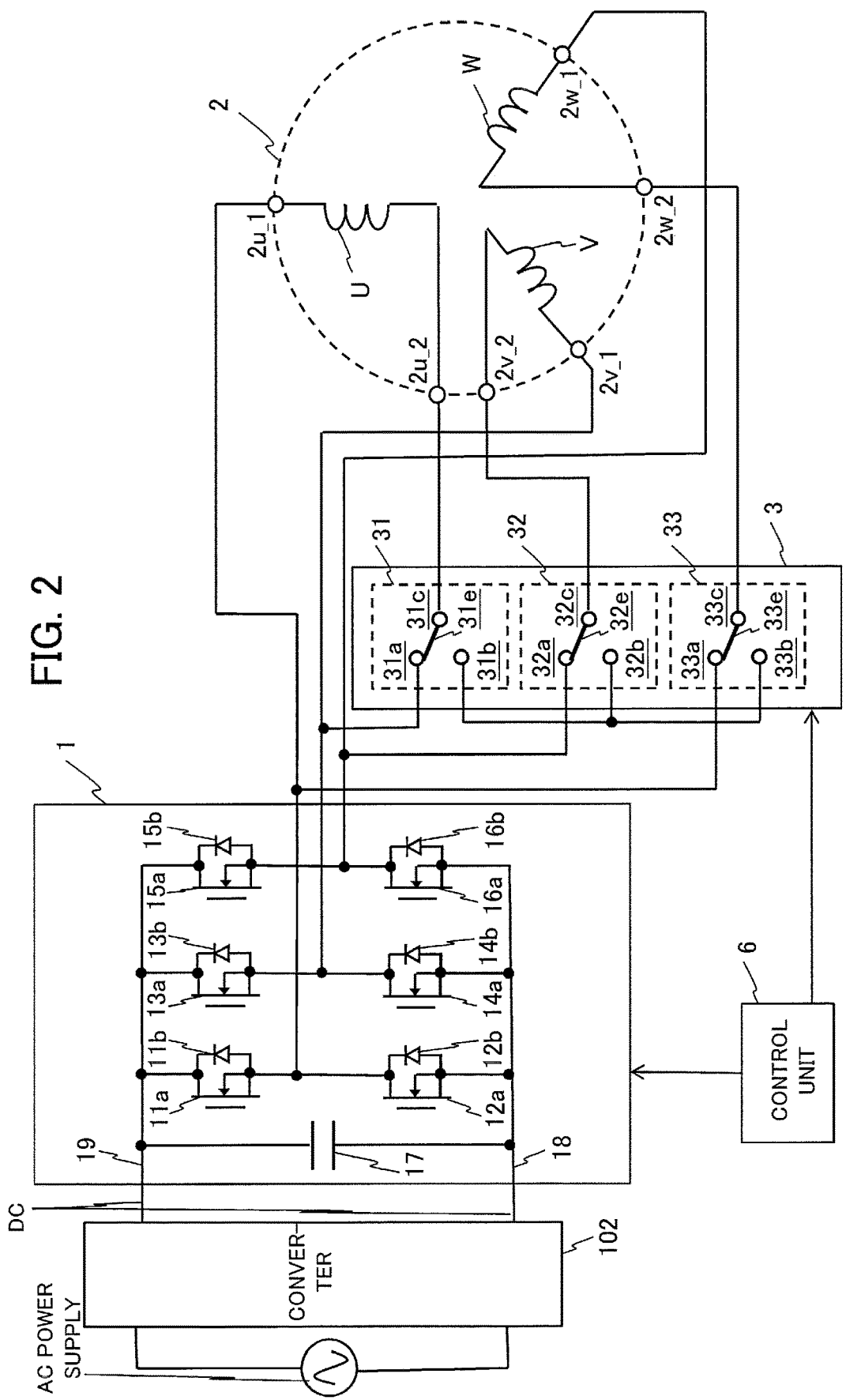
FIG. 2 is a diagram schematically showing the configuration of the motor driving device according to the first embodiment (in a case of delta connection).
Figure 3A:
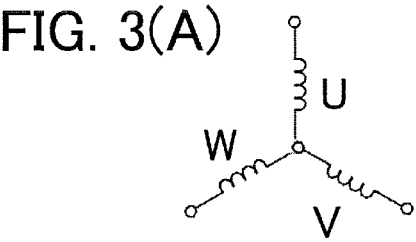
FIGS. 3(A) and 3(B) are diagrams showing the star connection and the delta connection.
Figure 3B:
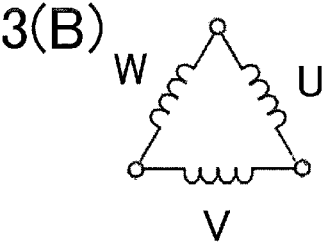

FIG. 1 is a diagram schematically showing a configuration of a motor driving device according to a first embodiment of the present invention (in a case of star connection). FIG. 2 is a diagram schematically showing the configuration of the motor driving device according to the first embodiment (in a case of delta connection). FIGS. 3(A) and 3(B) are diagrams showing the star connection (Y connection) and the delta connection (Δ connection).

As shown in FIG. 1 and FIG. 2, the motor driving device according to the first embodiment is a device that is connected to a converter 102 converting AC voltage supplied from an AC power supply into DC voltage and drives a motor 2 including stator windings of three phases, namely, a U-phase, a V-phase and a W-phase.

The motor driving device according to the first embodiment includes an inverter 1 that converts the DC voltage into AC drive voltages to be supplied to an open winding (first open winding) U, an open winding (second open winding) V and an open winding (third open winding) W that are the stator windings, a connection switching unit 3 that switches connection condition of the open winding U, the open winding V and the open winding W to either of first connection condition and second connection condition different from the first connection condition, and a control unit 6 that controls the inverter 1 and the connection switching unit 3. Further, the motor driving device may also include the converter 102.

In the first embodiment, the first connection condition is condition of the star connection (FIG. 3(A)) in which neutral points are connected together by the connection switching unit 3, and the second connection condition is condition of the delta connection (FIG. 3(B)). However, the number of phases of the stator windings of the motor 2 is not limited to three but can also be two or four or more.

The open winding U includes a winding terminal (first winding terminal) 2u_1 connected to a U-phase output terminal of the inverter 1 and a winding terminal (second winding terminal) 2u_2 connected to the connection switching unit 3. The open winding V includes a winding terminal (third winding terminal) 2v_1 connected to a V-phase output terminal of the inverter 1 and a winding terminal (fourth winding terminal) 2v_2 connected to the connection switching unit 3. The open winding W includes a winding terminal (fifth winding terminal) 2w_1 connected to a W-phase output terminal of the inverter 1 and a winding terminal (sixth winding terminal) 2w_2 connected to the connection switching unit 3.

As shown in FIG. 1 and FIG. 2, the inverter 1 includes MOS transistors (MOSFETs: Metal-Oxide-Semiconductor Field-Effect Transistors) 11a and 12a as switches connected in series between electric power supply lines 18 and 19 to which the DC voltage is supplied, MOS transistors 13a and 14a as switches connected in series between the electric power supply lines 18 and 19, MOS transistors 15a and 16a as switches connected in series between the electric power supply lines 18 and 19, and a capacitor 17 connected between the electric power supply lines 18 and 19.

The electric power supply lines 18 and 19 are busses supplied with the DC voltage outputted from the converter 102 converting the AC voltage into the DC voltage. The U-phase output terminal of the inverter 1 is connected to a node between the MOS transistors 11a and 12a, the V-phase output terminal of the inverter 1 is connected to a node between the MOS transistors 13a and 14a, and the W-phase output terminal of the inverter 1 is connected to a node between the MOS transistors 15a and 16a. Each MOS transistor 11a, 12a, 13a, 14a, 15a, 16a turns on (conduction between the source and the drain) or off (non-conduction between the source and the drain) according to an inverter drive signal outputted from the control unit 6, that is, a gate control signal for the MOS transistor.

The inverter 1 further includes parasitic diodes 11b, 12b, 13b, 14b, 15b and 16b as diodes respectively connected in parallel with the MOS transistors 11a, 12a, 13a, 14a, 15a and 16a. However, the configuration of the inverter 1 is not limited to the configuration shown in FIG. 1 and FIG. 2.

As shown in FIG. 1 and FIG. 2, the connection switching unit 3 includes mechanical switches (e.g., selection switches shown in FIGS. 7(A) and 7(B) which will be explained later), namely, a relay (first relay) 31, a relay (second relay) 32 and a relay (third relay) 33. The number of relays of the connection switching unit 3 is greater than or equal to the number of phases of the open windings of the stator windings.

The relay 31 has a first terminal (contact point) 31a connected to the V-phase output terminal of the inverter 1, a second terminal (contact point) 31b connected to a fifth terminal (contact point) 32b of the relay 32 and an eighth terminal (contact point) 33b of the relay 33 which will be described later, and a third terminal 31c connected to the winding terminal 2u_2 of the open winding U and electrically connected to one of the first terminal 31a and the second terminal 31b via a switch movable part 31e.

The relay 32 has a fourth terminal (contact point) 32a connected to the W-phase output terminal of the inverter 1, the fifth terminal (contact point) 32b connected to the second terminal 31b of the relay 31 and the eighth terminal 33b of the relay 33, and a sixth terminal 32c connected to the winding terminal 2v_2 of the open winding V and electrically connected to one of the fourth terminal 32a and the fifth terminal 32b via a switch movable part 32e.

The relay 33 has a seventh terminal (contact point) 33a connected to the U-phase output terminal of the inverter 1, the eighth terminal (contact point) 33b connected to the second terminal 31b of the relay 31 and the fifth terminal 32b of the relay 32, and a ninth terminal 33c connected to the winding terminal 2w_2 of the open winding W and electrically connected to one of the seventh terminal 33a and the eighth terminal 33b via a switch movable part 33e.

In the connection switching unit 3, the closing (conduction, namely, connection) and the opening (non-conduction, namely, disconnection) between terminals of the relays as the mechanical switches are controlled according to a connection switching signal outputted from the control unit 6 (e.g., control signal for an excitation switch that switches between excitation and non-excitation of an excitation coil shown in FIGS. 7(A) and 7(B) which will be explained later).

The connection switching signal is, for example, a control signal that commands ON or OFF of the excitation switch for switching between the excitation (energization) and the non-excitation (non-energization) of the excitation coil shown in FIGS. 7(A) and 7(B) which will be explained later. The connection switching signal is, for example, a control signal for the excitation switch that switches between the excitation and the non-excitation of the excitation coil shown in FIGS. 7(A) and 7(B) which will be explained later.

The connection switching unit 3 switches the connection condition of the stator windings of the motor 2 to the star connection (FIG. 3(A)) that is the first connection condition in which the neutral points are connected together by the connection switching unit 3, by connecting the second terminal 31b and the third terminal 31c together via the switch movable part 31e in the relay 31, connecting the fifth terminal 32b and the sixth terminal 32c together via the switch movable part 32e in the relay 32, and connecting the eighth terminal 33b and the ninth terminal 33c together via the switch movable part 33e in the relay 33.

Further, the connection switching unit 3 switches the connection condition to the delta connection (FIG. 3(B)) as the second connection condition by connecting the first terminal 31a and the third terminal 31c together via the switch movable part 31e in the relay 31, connecting the fourth terminal 32a and the sixth terminal 32c together via the switch movable part 32e in the relay 32, and connecting the seventh terminal 33a and the ninth terminal 33c together via the switch movable part 33e in the relay 33.

It is desirable from the viewpoint of reducing the electric power consumption that the control unit 6 select the star connection by non-exciting the excitation coils of the relays 31 to 33 in an operation mode in which ratio of the loss in the connection switching unit 3 to the total loss in the motor driving device is high, and select the delta connection by exciting the excitation coils of the relays 31 to 33 in an operation mode in which the ratio is low.

Incidentally, while the relays 31, 32 and 33 are shown in FIG. 1 and FIG. 2 as components independent of each other, the relays 31, 32 and 33 may also be implemented as one relay that concurrently operates the three switch movable parts 31e, 32e and 33e.

Figure 4:
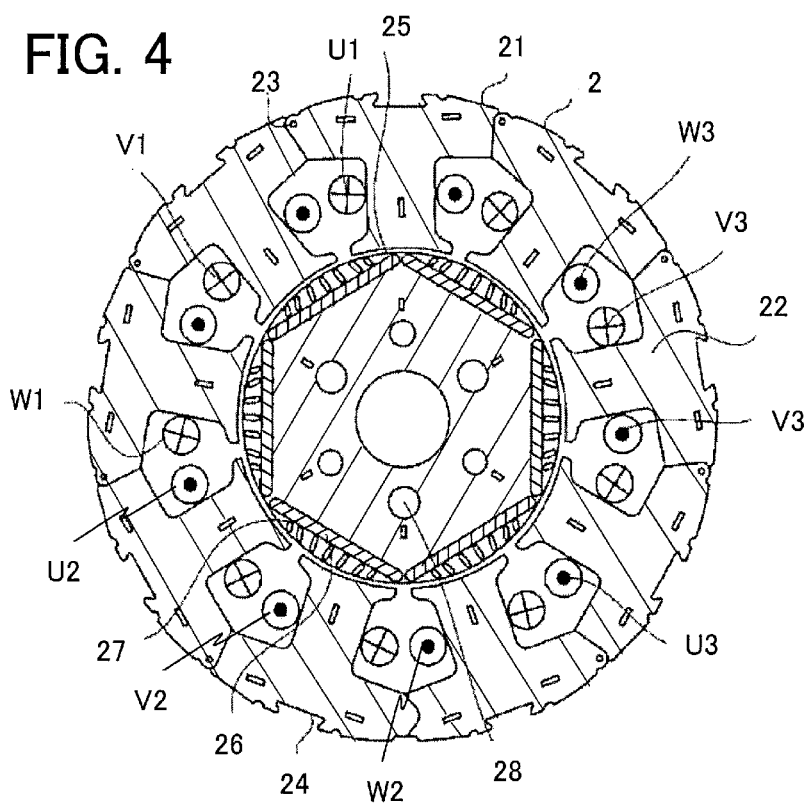
FIG. 4 is a cross-sectional view schematically showing internal structure of a motor shown in FIG. 1 and FIG. 2.

FIG. 4 is a cross-sectional view schematically showing the internal structure of the motor 2 shown in FIG. 1 and FIG. 2. As shown in FIG. 4, the motor 2 is a permanent magnet motor in which permanent magnets 26 are embedded in a rotor 25. The motor 2 includes a stator 21 and the rotor 25 arranged in a space on a central side of the stator 21 and supported to be rotatable around a shaft. An air gap is secured between an outer circumferential surface of the rotor 25 and an inner circumferential surface of the stator 21. The air gap between the stator 21 and the rotor 25 is a clearance of approximately 0.3 mm to 1 mm. Specifically, the rotor 25 is rotated by energizing the stator windings with electric current in sync with a command revolution speed by use of the inverter 1 and generating a rotating magnetic field.

Windings U1 to U3, windings V1 to V3, and windings W1 to W3 are wound around tooth parts 22 of the stator 21 via insulating material by means of concentrated winding. The windings U1 to U3 correspond to the open winding U in FIG. 1, the windings V1 to V3 correspond to the open winding V in FIG. 1, and the windings W1 to W3 correspond to the open winding W in FIG. 1.

The stator 21 shown in FIG. 4 is formed of a plurality of split cores arranged in a ring-like shape around a rotation axis 23 when adjacent split cores are connected together, and the split cores arranged in a ring-like shape (a state in which the split cores are closed) can be turned into the split cores arranged in a straight line (a state in which the split cores are open) by opening the tooth parts 22 adjacently arranged. With this configuration, the winding process can be performed in a state in which the split cores are arranged in a straight line and the tooth parts 22 have wide spaces between each other, by which the winding process can be simplified and winding quality can be improved (e.g., occupancy ratio can be increased).

As the permanent magnets 26 embedded in the rotor 25, rare-earth magnets or ferrite magnets are employed, for example. Slits 27 are arranged in outer circumferential core parts of the permanent magnets 26. The slits 27 have a function of lessening the influence of armature reaction caused by the electric current of the stator windings and reducing the superimposition of harmonics on the magnetic flux distribution. Further, the core of the stator 21 and the core of the rotor 25 are provided with air vents 24 and 28. The air vents 24 and 28 have a function of cooling down the motor 2 while serving as refrigerant gas channels or oil return channels.

The motor 2 shown in FIG. 4 has structure of concentrated winding in which the ratio between the number of magnetic poles and the number of slots is 2:3. The motor 2 includes the rotor having permanent magnets for six poles and the stator 21 having nine slots (nine tooth parts). Thus, the motor 2, being a six-pole motor having six permanent magnets, employs structure having windings on three tooth parts (three slots) per phase. In a case of a four-pole motor, the number of tooth parts (the number of slots) is six and it is desirable to employ structure having windings on two tooth parts per phase. In a case of an eight-pole motor, the number of tooth parts is twelve and it is desirable to employ structure having windings on four tooth parts per phase. When three-phase windings are used in the delta connection, there are cases where circulating current flows in the windings of the motor 2 and deteriorates the performance of the motor 2. The circulating current flows due to the third harmonic of inductive voltage in the winding of each phase, and in the case of the concentrated winding in which the ratio between the number of magnetic poles and the number of slots is 2:3, no third harmonic occurs in the inductive voltage due to phase relationship between the windings and the permanent magnets as long as there is no influence of magnetic saturation or the like. In the first embodiment, the motor 2 is configured with the concentrated winding in which the ratio between the number of magnetic poles and the number of slots is 2:3 in order to inhibit the circulating current in use of the motor 2 in delta connection. However, the number of magnetic poles, the number of slots, and the winding method (concentrated winding, distributed winding) may be properly selected depending on required motor size, characteristics (revolution speed, torque, etc.), voltage specifications, cross-sectional area of the slots, and so forth. Further, the structure of the motor to which the present invention is applicable is not limited to that shown in FIG. 4.

Figure 5A:
FIGS. 5(A) to 5(C) are diagrams showing U-phase windings connected in series, V-phase windings connected in series, and W-phase windings connected in series.
Figure 5B:
Figure 5C:
Figure 6A:
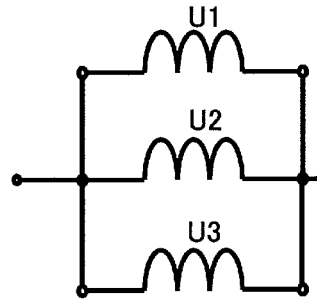
FIGS. 6(A) to 6(C) are diagrams showing U-phase windings connected in parallel, V-phase windings connected in parallel, and W-phase windings connected in parallel.
Figure 6B:
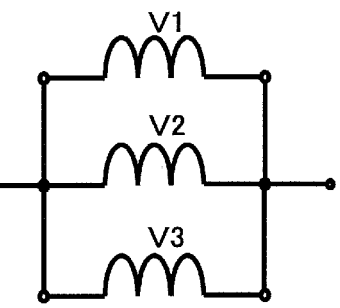
Figure 6C:
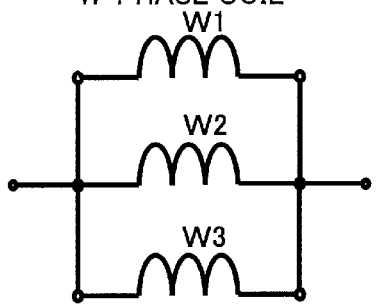

FIGS. 5(A) to 5(C) show an example of the windings shown in FIG. 3, namely, the windings U1, U2 and U3 connected in series, the windings V1, V2 and V3 connected in series, and the windings W1, W2 and W3 connected in series. FIGS. 6(A) to 6(C) show another example of the windings shown in FIG. 3, namely, the windings U1, U2 and U3 connected in parallel, the windings V1, V2 and V3 connected in parallel, and the windings W1, W2 and W3 connected in parallel.

Figure 7A:
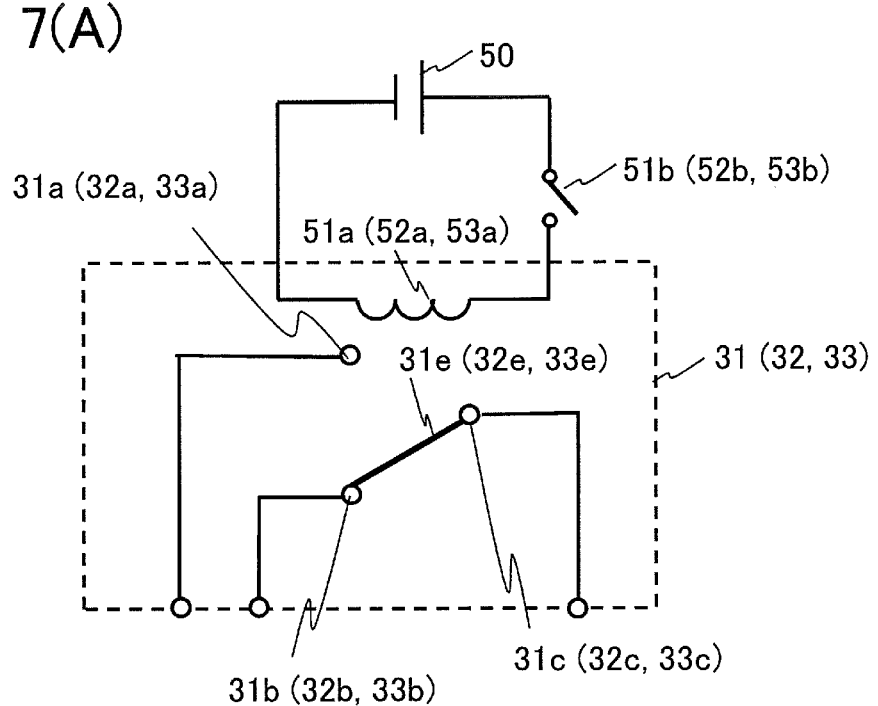
FIGS. 7(A) and 7(B) are diagrams showing relays of a connection switching unit in the motor driving device shown in FIG. 1 and FIG. 2.
Figure 7B:
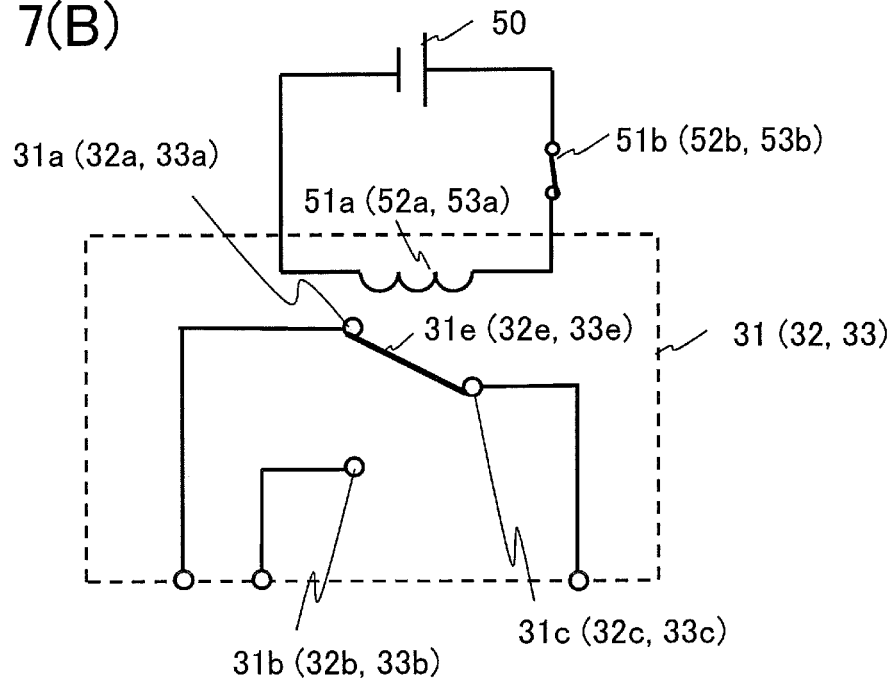

FIGS. 7(A) and 7(B) are diagrams showing the relays 31, 32 and 33 of the connection switching unit 3 in the motor driving device shown in FIG. 1 and FIG. 2. The relays 31, 32 and 33 have the same configuration as each other and operate in the same way, and thus the configuration of the relay 31 will be described in detail below and description of the configuration and operation of the relays 32 and 33 will be partially omitted.

As shown in FIGS. 7(A) and 7(B), an excitation unit including a power supply 50, an excitation coil 51a and an excitation switch 51b is provided in the vicinity of the relay 31. The excitation unit opens (is turned off) the excitation switch 51b and thereby shifts to a non-excitation state in which no excitation current is fed to the excitation coil 51a, or closes (is turned on) the excitation switch 51b and thereby shifts to an excitation state in which excitation current flows from the power supply 50 to the excitation coil 51a and excitation occurs to the excitation coil 51a. The excitation coil 51a is arranged at a position adjoining the first terminal 31a of the relay 31, and the second terminal 31b is arranged at a position farther than the first terminal 31a.

The relay 31 includes the switch movable part 31e in addition to the first terminal 31a connected to an output terminal of the inverter 1, the second terminal 31b, and the third terminal 31c connected to the winding terminal 2u_2 of the open winding U. One end (first end) of the switch movable part 31e is connected to the third terminal 31c, while the other end (second end) of the switch movable part 31e is electrically connected to one of the first terminal 31a and the second terminal 31b depending on the state of the excitation switch.

As shown in FIG. 7(A), in the non-excitation state in which the excitation switch 51b is opened (set to off) and no excitation current is fed to the excitation coil 51a, the other end of the switch movable part 31e is connected to the second terminal 31b and the relay 31 electrically connects the second terminal 31b and the third terminal 31c together.

As shown in FIG. 7(B), in the excitation state in which the excitation switch 51b is closed (set to on) and the excitation current is supplied from the power supply 50 to the excitation coil 51a, the other end of the switch movable part 31e is attracted by the excitation occurring to the excitation coil 51a and approaches from the second terminal 31b to the first terminal 31a, and the relay 31 electrically connects the first terminal 31a and the third terminal 31c together by use of the switch movable part 31e connected to the first terminal 31a.

The relay 32 includes the fourth terminal 32a connected to an output terminal of the inverter 1, the fifth terminal 32b connected to the second terminal 31b, and the sixth terminal 32c connected to the winding terminal 2v_2 of the open winding V and electrically connected to one of the fourth terminal 32a and the fifth terminal 32b by the switch movable part 32e.

As shown in FIG. 7(A), in the non-excitation state in which the excitation switch 52b is opened (set to off) and no excitation current is fed to the excitation coil 52a, the relay 32 electrically connects the fifth terminal 32b and the sixth terminal 32c together by use of the switch movable part 32e. As shown in FIG. 7(B), in the excitation state in which the excitation switch 52b is closed (set to on) and the excitation current is supplied from the power supply 50 to the excitation coil 52a, the relay 32 electrically connects the fourth terminal 32a and the sixth terminal 32c together by use of the switch movable part 32e.

The relay 33 includes the seventh terminal 33a connected to the inverter 1, the eighth terminal 33b connected to the second terminal 31b and the fifth terminal 32b, and the ninth terminal 33c connected to the winding terminal 2w_2 of the open winding W and electrically connected to one of the seventh terminal 33a and the eighth terminal 33b by the switch movable part 33e.

As shown in FIG. 7(A), in the non-excitation state in which the excitation switch 53b is opened (set to off) and no excitation current is fed to the excitation coil 53a, the relay 33 electrically connects the eighth terminal 33b and the ninth terminal 33c together by use of the switch movable part 33e. As shown in FIG. 7(B), in the excitation state in which the excitation switch 53b is closed (set to on) and the excitation current is supplied from the power supply 50 to the excitation coil 53a, the relay 33 electrically connects the seventh terminal 33a and the ninth terminal 33c together by use of the switch movable part 33e.

FIG. 8 is a diagram showing an example of open states and closed states between terminals of the mechanical switches in the relays 31, 32 and 33 shown in FIGS. 7(A) and 7(B) in a tabular form. The relays 31, 32 and 33 have the same configuration as each other, and the excitation switches 51b, 52b and 53b are operated in the same way and the switch movable parts 31e, 32e and 33e of the relays 31, 32 and 33 are operated in the same way according to the connection switching signal outputted from the control unit 6.

As shown in FIG. 1, FIG. 7(A) and FIG. 8, the connection switching unit 3 is capable of switching the connection condition of the stator windings to the star connection that is the first connection condition by setting the second terminal 31b and the third terminal 31c in the closed state (connecting the second terminal 31b and the third terminal 31c together) with the switch movable part 31e, setting the fifth terminal 32b and the sixth terminal 32c in the closed state (connecting the fifth terminal 32b and the sixth terminal 32c together) with the switch movable part 32e, and setting the eighth terminal 33b and the ninth terminal 33c in the closed state (connecting the eighth terminal 33b and the ninth terminal 33c together) with the switch movable part 33e in the non-excitation state in which the excitation switches 51b, 52b and 53b are opened (set to off) and no excitation current is fed to the excitation coils 51a, 52a and 53a.

In this case, current supplied from the inverter 1 flows between the second terminal 31b and the third terminal 31c through the switch movable part 31e connecting the second terminal 31b and the third terminal 31c together. Similarly, current supplied from the inverter 1 flows between the fifth terminal 32b and the sixth terminal 32c through the switch movable part 32e connecting the fifth terminal 32b and the sixth terminal 32c together. Similarly, current supplied from the inverter 1 flows between the eighth terminal 33b and the ninth terminal 33c through the switch movable part 33e connecting the eighth terminal 33b and the ninth terminal 33c together.

As shown in FIG. 2, FIG. 7(B) and FIG. 8, the connection switching unit 3 is capable of switching the connection condition of the stator windings to the delta connection that is the second connection condition by setting the first terminal 31a and the third terminal 31c in the closed state (connecting the first terminal 31a and the third terminal 31c together) with the switch movable part 31e, setting the fourth terminal 32a and the sixth terminal 32c in the closed state (connecting the fourth terminal 32a and the sixth terminal 32c together) with the switch movable part 32e, and setting the seventh terminal 33a and the ninth terminal 33c in the closed state (connecting the seventh terminal 33a and the ninth terminal 33c together) with the switch movable part 33e in the excitation state in which the excitation switches 51b, 52b and 53b are closed (set to on) and the excitation current is fed to the excitation coils 51a, 52a and 53a.

In this case, current supplied from the inverter 1 flows between the first terminal 31a and the third terminal 31c through the switch movable part 31e connecting the first terminal 31a and the third terminal 31c together. Similarly, current supplied from the inverter 1 flows between the fourth terminal 32a and the sixth terminal 32c through the switch movable part 32e connecting the fourth terminal 32a and the sixth terminal 32c together. Similarly, current supplied from the inverter 1 flows between the seventh terminal 33a and the ninth terminal 33c through the switch movable part 33e connecting the seventh terminal 33a and the ninth terminal 33c together.

Since the switching time of the mechanical switches of the connection switching unit 3 is normally some hundred milliseconds, the operation of the motor 2 is stopped (in a case of an air conditioner, the operation of the compressor driven by the motor is stopped) for switching the connection condition and the connection condition switching operation is performed in the stoppage period. Incidentally, switching timing of the connection condition will be explained in a third embodiment which will be described later.

As described above, with the motor driving device according to the first embodiment, the connection condition of the stator windings can be switched appropriately by switching the states of the switch movable parts 31e, 32e and 33e of the relays 31, 32 and 33 as the mechanical switches included in the connection switching unit 3 through the excitation or non-excitation of the excitation coils 51a, 52a and 53a. Accordingly, the motor 2 can be driven in high speed rotation with the delta connection, and the motor 2 can be driven with high efficiency in low speed rotation with the star connection.

Further, with the motor driving device according to the first embodiment, the excitation coils 51a, 52a and 53a are set in the non-excitation state as shown in FIG. 7(A) in the star connection achieving high efficiency in low speed rotation. Thus, in a case where the motor driving device according to the first embodiment is used for driving a motor for a compressor of an air conditioner, electric power consumption can be reduced since the excitation of the excitation coils 51a, 52a and 53a is unnecessary in low speed rotation whose operating time is supposed to be long.

(2) Second Embodiment

Figure 9:
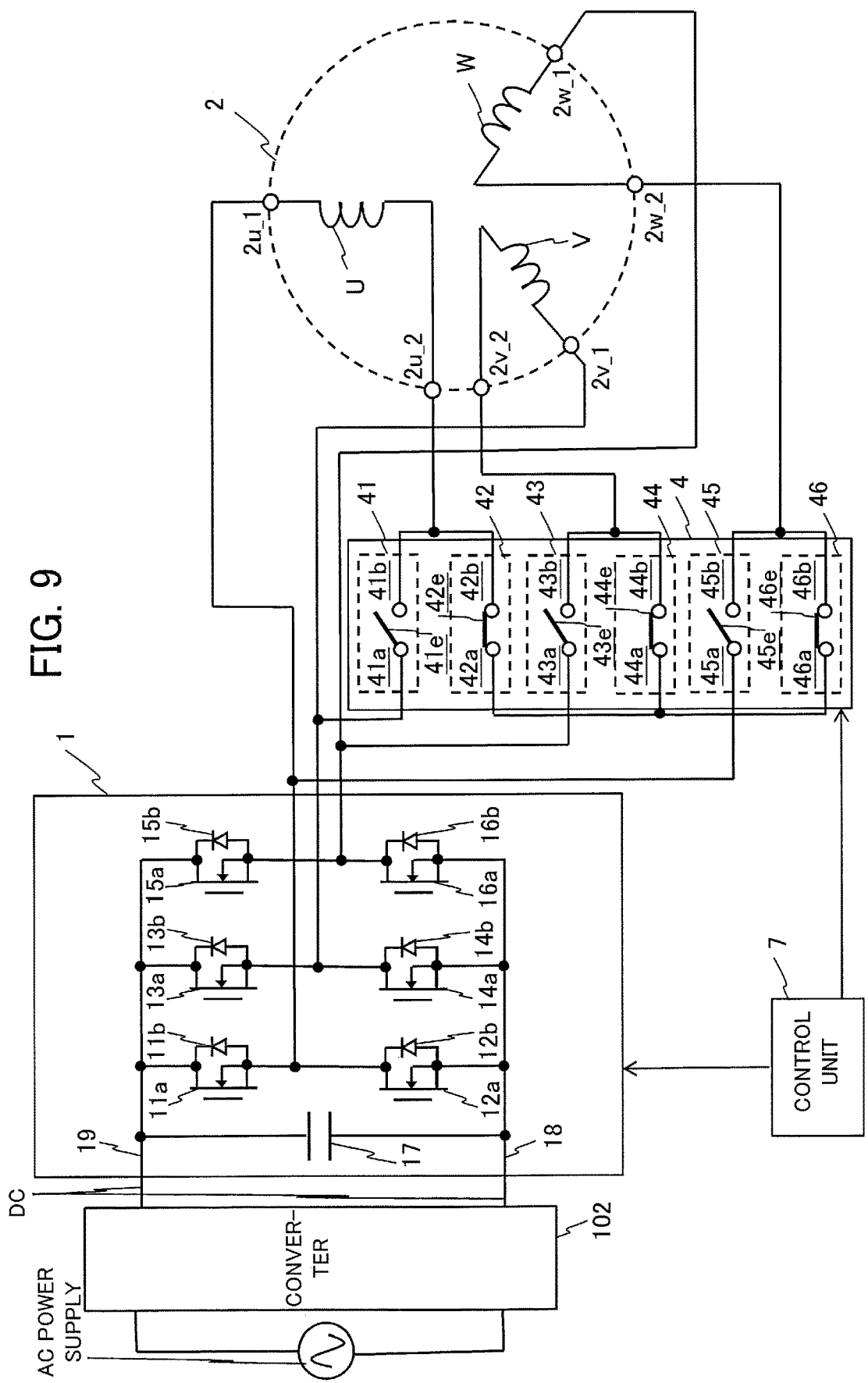
FIG. 9 is a diagram schematically showing a configuration of a motor driving device according to a second embodiment of the present invention (in the case of the star connection).
Figure 10:
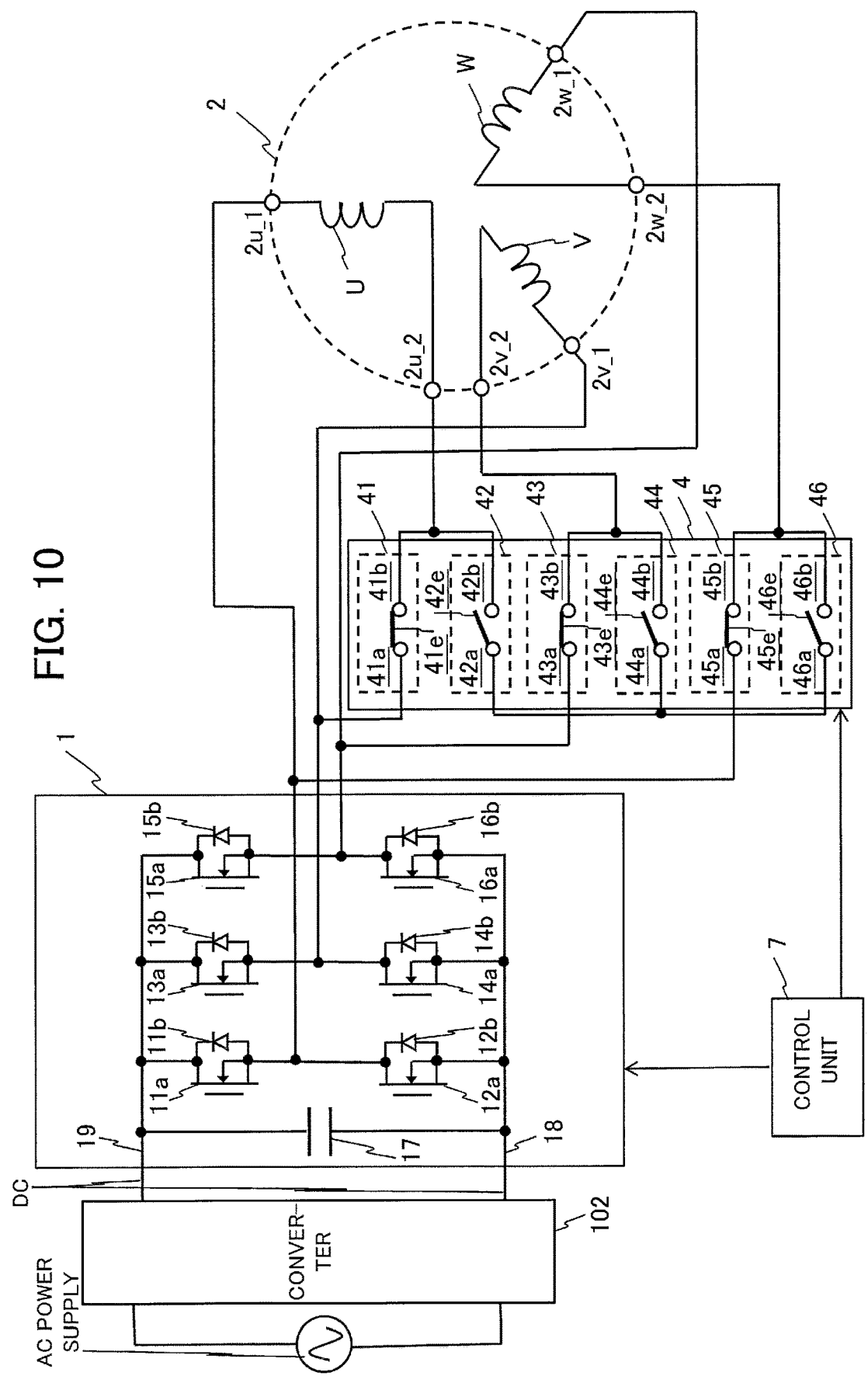
FIG. 10 is a diagram schematically showing the configuration of the motor driving device according to the second embodiment (in the case of the delta connection).

FIG. 9 is a diagram schematically showing a configuration of a motor driving device according to a second embodiment of the present invention (in the case of the star connection). FIG. 10 is a diagram schematically showing the configuration of the motor driving device according to the second embodiment (in the case of the delta connection). In FIG. 9, each component identical or corresponding to a component shown in FIG. 1 is assigned the same reference character as in FIG. 1. In FIG. 10, each component identical or corresponding to a component shown in FIG. 2 is assigned the same reference character as in FIG. 2.

The motor driving device according to the second embodiment differs from the motor driving device according to the first embodiment in the configuration of a connection switching unit 4 and a connection switching signal outputted from a control unit 7. Except these features, the motor driving device according to the second embodiment is the same as the motor driving device according to the first embodiment. Thus, the description of the second embodiment will be given mainly of the difference from the first embodiment.

As shown in FIG. 9 and FIG. 10, the motor driving device according to the second embodiment is a device that drives a motor 2 including stator windings of three phases. The motor driving device according to the second embodiment includes the inverter 1, the connection switching unit 4 that switches the connection condition of the open winding U, the open winding V and the open winding W to either of the first connection condition and the second connection condition different from the first connection condition, and the control unit 7 that controls the inverter 1 and the connection switching unit 4. In the second embodiment, the first connection condition is the condition of the star connection in which the neutral points are connected together by the connection switching unit 4, and the second connection condition is the condition of the delta connection.

As shown in FIG. 9 and FIG. 10, the connection switching unit 4 includes mechanical switches (e.g., open/close switches shown in FIGS. 11(A) and 11(B) and FIGS. 12(A) and 12(B) which will be explained later), namely, a relay (first relay) 41, a relay (second relay) 42, a relay (third relay) 43, a relay (fourth relay) 44, a relay (fifth relay) 45 and a relay (sixth relay) 46.

The relay 41 includes a first terminal 41a connected to an output terminal of the inverter 1, a second terminal 41b connected to the winding terminal 2u_2 of the open winding U, and a switch movable part 41e capable of connecting the first terminal 41a and the second terminal 41b together. The relay 42 includes a third terminal 42a, a fourth terminal 42b connected to the winding terminal 2u_2 of the open winding U, and a switch movable part 42e capable of connecting the third terminal 42a and the fourth terminal 42b together.

The relay 43 includes a fifth terminal 43a connected to an output terminal of the inverter 1, a sixth terminal 43b connected to the winding terminal 2v_2 of the open winding V, and a switch movable part 43e capable of connecting the fifth terminal 43a and the sixth terminal 43b together. The relay 44 includes a seventh terminal 44a connected to the third terminal 42a, an eighth terminal 44b connected to the winding terminal 2v_2 of the open winding V, and a switch movable part 44e capable of connecting the seventh terminal 44a and the eighth terminal 44b together.

The relay 45 includes a ninth terminal 45a connected to an output terminal of the inverter 1, a tenth terminal 45b connected to the winding terminal 2w_2 of the open winding W, and a switch movable part 45e capable of connecting the ninth terminal 45a and the tenth terminal 45b together. The relay 46 includes an eleventh terminal 46a connected to the third terminal 42a and the seventh terminal 44a, a twelfth terminal 46b connected to the winding terminal 2w_2 of the open winding W, and a switch movable part 46e capable of connecting the eleventh terminal 46a and the twelfth terminal 46b together.

As shown in FIG. 9, the connection switching unit 4 is capable of switching the connection condition of the stator windings to the star connection (FIG. 3(A)) that is the first connection condition by setting the first terminal 41a and the second terminal 41b in the open state, setting the fifth terminal 43a and the sixth terminal 43b in the open state, setting the ninth terminal 45a and the tenth terminal 45b in the open state, setting the third terminal 42a and the fourth terminal 42b in the closed state with the switch movable part 42e, setting the seventh terminal 44a and the eighth terminal 44b in the closed state with the switch movable part 44e, and setting the eleventh terminal 46a and the twelfth terminal 46b in the closed state with the switch movable part 46e.

Further, as shown in FIG. 10, the connection switching unit 4 is capable of switching the connection condition of the stator windings to the delta connection (FIG. 3(B)) that is the second connection condition by setting the first terminal 41a and the second terminal 41b in the closed state with the switch movable part 41e, setting the fifth terminal 43a and the sixth terminal 43b in the closed state with the switch movable part 43e, setting the ninth terminal 45a and the tenth terminal 45b in the closed state with the switch movable part 45e, setting the third terminal 42a and the fourth terminal 42b in the open state, setting the seventh terminal 44a and the eighth terminal 44b in the open state, and setting the eleventh terminal 46a and the twelfth terminal 46b in the open state.

Incidentally, while the six relays 41 to 46 are shown in FIG. 9 and FIG. 10 as components independent of each other, the relays 41 to 46 may be implemented as any type of relay that concurrently operates the three switch movable parts 41e, 43e and 45e and concurrently operates the three switch movable parts 42e, 44e and 46e, and the number of relays can be different from six.

Figure 11A:
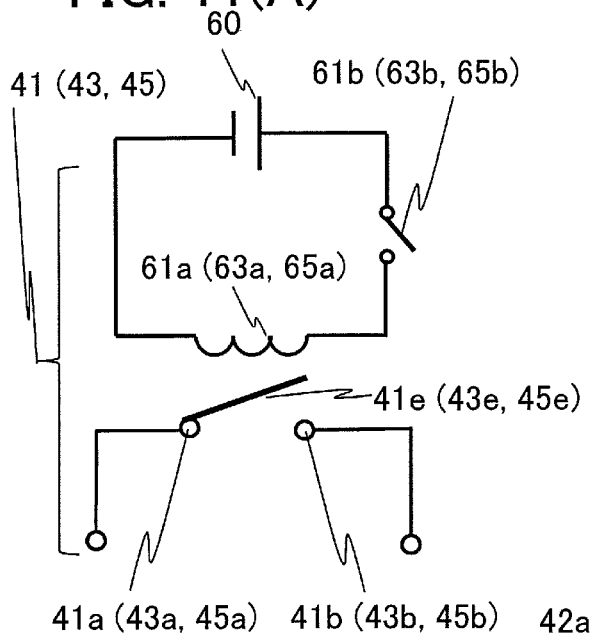
FIGS. 11(A) and 11(B) are diagrams showing relays of a connection switching unit in the motor driving device shown in FIG. 9.
Figure 11B:
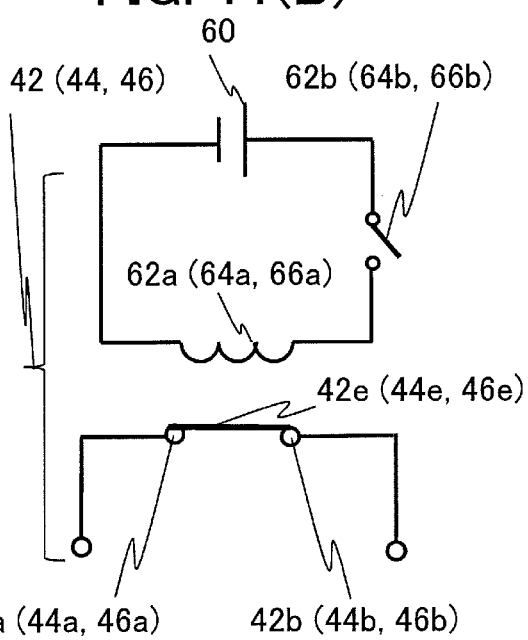
Figure 12A:
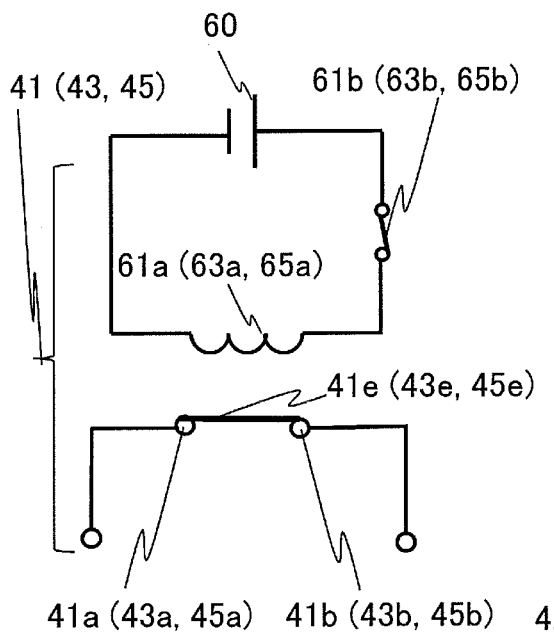
FIGS. 12(A) and 12(B) are diagrams showing the relays of the connection switching unit in the motor driving device shown in FIG. 10.
Figure 12B:
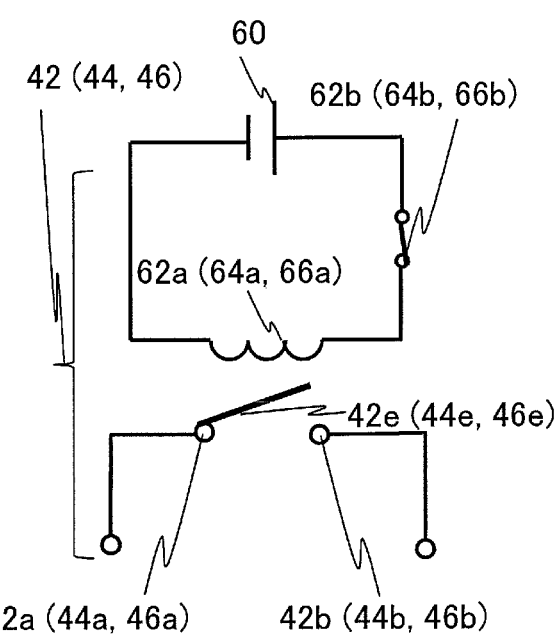
Figures 13, 14:
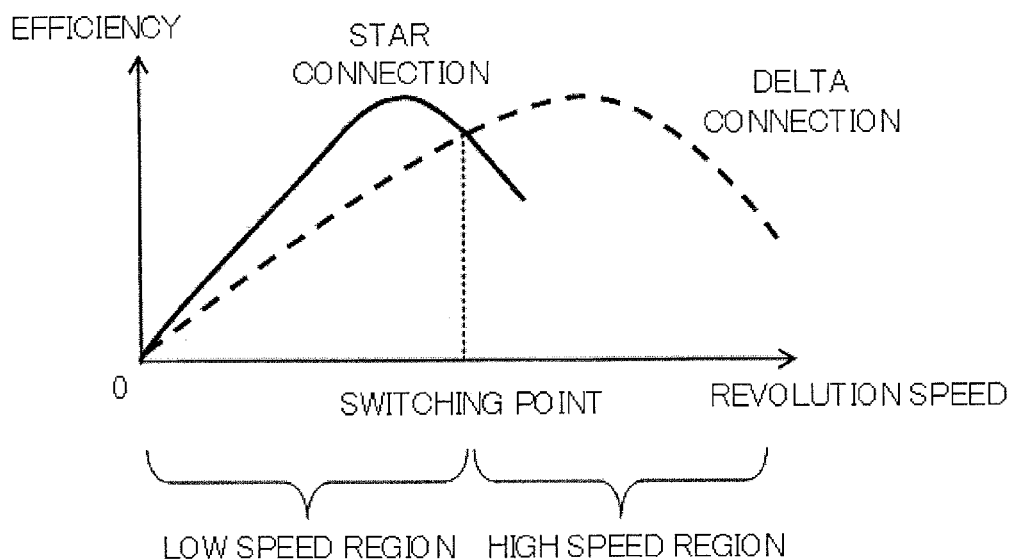
FIG. 13 is a diagram showing an example of open/closed states of the relays in the connection switching unit shown in FIG. 9 and FIG. 10 in a tabular form.
FIG. 14 is a graph showing the relationship between revolution speed of the motor and efficiency of the motor in a case where connection condition is the star connection and the delta connection.

FIGS. 11(A) and 11(B) are diagrams showing the relays 41 to 46 of the connection switching unit 4 in the motor driving device shown in FIG. 9. FIGS. 12(A) and 12(B) are diagrams showing the relays 41 to 46 of the connection switching unit 4 in the motor driving device shown in FIG. 10. FIG. 13 is a diagram showing an example of open states and closed states between terminals in the relays 41 to 46 shown in FIGS. 11(A) and 11(B) and FIGS. 12(A) and 12(B) in a tabular form.

The relays 41, 43 and 45 have the same configuration as each other, and excitation switches 61b, 63b and 65b are operated in the same way and the switch movable parts 41e, 43e and 45e of the relays 41, 43 and 45 are operated in the same way according to the connection switching signal outputted from the control unit 7. The relays 42, 44 and 46 have the same configuration as each other, and excitation switches 62b, 64b and 66b are operated in the same way and the switch movable parts 42e, 44e and 46e of the relays 42, 44 and 46 are operated in the same way according to the connection switching signal outputted from the control unit 7.

As shown in FIG. 11(A) and FIG. 12(A), the relay 41 is capable of setting the first terminal 41a connected to an output terminal of the inverter 1 and the second terminal 41b connected to the winding terminal 2u_2 of the open winding U in the open state (disconnected state) when an excitation coil 61a is in the non-excitation state, or in the closed state (connected state) with the switch movable part 41e when the excitation coil 61a is in the excitation state.

As shown in FIG. 11(B) and FIG. 12(B), the relay 42 is capable of setting the third terminal 42a connected to an output terminal of the inverter 1 and the fourth terminal 42b connected to the winding terminal 2u_2 of the open winding U in the closed state (connected state) with the switch movable part 41e when an excitation coil 62a is in the non-excitation state, or in the open state (disconnected state) when the excitation coil 62a is in the excitation state.

As shown in FIG. 11(A) and FIG. 12(A), the relay 43 is capable of setting the fifth terminal 43a connected to an output terminal of the inverter 1 and the sixth terminal 43b connected to the winding terminal 2v_2 of the open winding V in the open state (disconnected state) when an excitation coil 63a is in the non-excitation state, or in the closed state (connected state) with the switch movable part 43e when the excitation coil 63a is in the excitation state.

As shown in FIG. 11(B) and FIG. 12(B), the relay 44 is capable of setting the seventh terminal 44a connected to an output terminal of the inverter 1 and the eighth terminal 44b connected to the winding terminal 2v_2 of the open winding V in the closed state (connected state) with the switch movable part 44e when an excitation coil 64a is in the non-excitation state, or in the open state (disconnected state) when the excitation coil 64a is in the excitation state.

As shown in FIG. 11(A) and FIG. 12(A), the relay 45 is capable of setting the ninth terminal 45a connected to an output terminal of the inverter 1 and the tenth terminal 45b connected to the winding terminal 2w_2 of the open winding W in the open state (disconnected state) when an excitation coil 65a is in the non-excitation state, or in the closed state (connected state) with the switch movable part 45e when the excitation coil 65a is in the excitation state.

As shown in FIG. 11(B) and FIG. 12(B), the relay 46 is capable of setting the eleventh terminal 46a connected to an output terminal of the inverter 1 and the twelfth terminal 46b connected to the winding terminal 2w_2 of the open winding W in the closed state (connected state) with the switch movable part 46e when an excitation coil 66a is in the non-excitation state, or in the open state (disconnected state) when the excitation coil 66a is in the excitation state.

As shown in FIG. 9, FIGS. 11(A) and 11(B) and FIG. 13, the connection switching unit 4 is capable of switching the connection condition of the stator windings to the star connection that is the first connection condition by setting the third terminal 42*a* and the fourth terminal 42*b* in the closed state (connecting the third terminal 42*a* and the fourth terminal 42*b* together) with the switch movable part 42*e*, setting the seventh terminal 44*a* and the eighth terminal 44*b* in the closed state (connecting the seventh terminal 44*a* and the eighth terminal 44*b* together) with the switch movable part 44*e*, and setting the eleventh terminal 46*a* and the twelfth terminal 46*b* in the closed state (connecting the eleventh terminal 46*a* and the twelfth terminal 46*b* together) with the switch movable part 46*e* in the non-excitation state of the excitation coils 61*a*, 62*a*, 63*a*, 64*a*, 65*a* and 66*a* with the excitation switches 61*b*, 62*b*, 63*b*, 64*b*, 65*b* and 66*b* open (off).

In this case, current supplied from the inverter 1 flows between the third terminal 42*a* and the fourth terminal 42*b* through the switch movable part 42*e* connecting the third terminal 42*a* and the fourth terminal 42*b* together. Similarly, current supplied from the inverter 1 flows between the seventh terminal 44*a* and the eighth terminal 44*b* through the switch movable part 44*e* connecting the seventh terminal 44*a* and the eighth terminal 44*b* together. Similarly, current supplied from the inverter 1 flows between the eleventh terminal 46*a* and the twelfth terminal 46*b* through the switch movable part 46*e* connecting the eleventh terminal 46*a* and the twelfth terminal 46*b* together.

As shown in FIG. 10, FIGS. 12(A) and 12(B) and FIG. 13, the connection switching unit 4 is capable of switching the connection condition of the stator windings to the delta connection that is the second connection condition by setting the first terminal 41*a* and the second terminal 41*b* in the closed state (connecting the first terminal 41*a* and the second terminal 41*b* together) with the switch movable part 41*e*, setting the fifth terminal 43*a* and the sixth terminal 43*b* in the closed state (connecting the fifth terminal 43*a* and the sixth terminal 43*b* together) with the switch movable part 43*e*, and setting the ninth terminal 45*a* and the tenth terminal 45*b* in the closed state (connecting the ninth terminal 45*a* and the tenth terminal 45*b* together) with the switch movable part 45*e* in the excitation state of the excitation coils 61*a*, 62*a*, 63*a*, 64*a*, 65*a* and 66*a* with the excitation switches 61*b*, 62*b*, 63*b*, 64*b*, 65*b* and 66*b* closed (on).

In this case, current supplied from the inverter 1 flows between the first terminal 41*a* and the second terminal 41*b* through the switch movable part 41*e* connecting the first terminal 41*a* and the second terminal 41*b* together. Similarly, current supplied from the inverter 1 flows between the fifth terminal 43*a* and the sixth terminal 43*b* through the switch movable part 43*e* connecting the fifth terminal 43*a* and the sixth terminal 43*b* together. Similarly, current supplied from the inverter 1 flows between the ninth terminal 45*a* and the tenth terminal 45*b* through the switch movable part 45*e* connecting the ninth terminal 45*a* and the tenth terminal 45*b* together.

Since the switching time of the mechanical switches of the connection switching unit 4 is normally some hundred milliseconds, the operation of the motor 2 is stopped (in a case of an air conditioner, the operation of the compressor driven by the motor is stopped), for example, for switching the connection condition and the connection condition switching operation is performed in the stoppage period.

As described above, with the motor driving device according to the second embodiment, the connection condition of the stator windings can be switched appropriately by switching the states of the switch movable parts 41*e*, 42*e*, 43*e*, 44*e*, 45*e* and 46*e* of the relays 41 to 46 as the mechanical switches included in the connection switching unit 4 through the excitation or non-excitation of the excitation coils 61*a*, 62*a*, 63*a*, 64*a*, 65*a* and 66*a*. Accordingly, the motor 2 can be driven in high speed rotation with the delta connection, and the motor 2 can be driven with high efficiency in low speed rotation with the star connection.

FIG. 14 is a graph showing the relationship between the revolution speed of the motor 2 and the efficiency of the motor 2 in a case where the connection condition is the star connection and the delta connection. The horizontal axis of FIG. 14 represents the revolution speed of the motor 2 and the vertical axis of FIG. 14 represents the efficiency of the motor 2 (ratio of mechanical output power to input electric power). As shown in FIG. 14, the efficiency of the motor 2 in the case where the connection condition is the star connection is excellent in a low speed (low load) region in which the revolution speed of the motor 2 is low, but drops in a high speed (overload) region in which the revolution speed of the motor 2 is high. The efficiency of the motor 2 in the case where the connection condition is the delta connection is inferior to that in the case of the star connection in the low speed (low load) region, but increases in the high speed (overload) region. Thus, the star connection excels in the efficiency in the low speed (low load) region, while the delta connection excels in the efficiency in the high speed (overload) region. Accordingly, it is desirable to make the switching to a connection condition of higher efficiency at the switching point shown in FIG. 14.

Further, with the motor driving device according to the second embodiment, the excitation coils 61*a*, 62*a*, 63*a*, 64*a*, 65*a* and 66*a* are set in the non-excitation state as shown in FIGS. 11(A) and 11(B) in the star connection achieving high efficiency in low speed rotation. Thus, in a case where the motor driving device according to the second embodiment is used for driving a motor for a compressor of an air conditioner, the electric power consumption can be reduced since the excitation of the excitation coils 61*a*, 62*a*, 63*a*, 64*a*, 65*a* and 66*a* is unnecessary in low speed rotation whose operating time is supposed to be long.

Furthermore, in the motor driving device according to the second embodiment, the number of lines connected to one relay is two, and thus handling (attaching process) of lines in a circuit board having a limited area is easier compared to the case of the first embodiment in which the number of lines connected to one relay is three, and downsizing of the circuit board is possible.

(3) Third Embodiment

Figure 15:
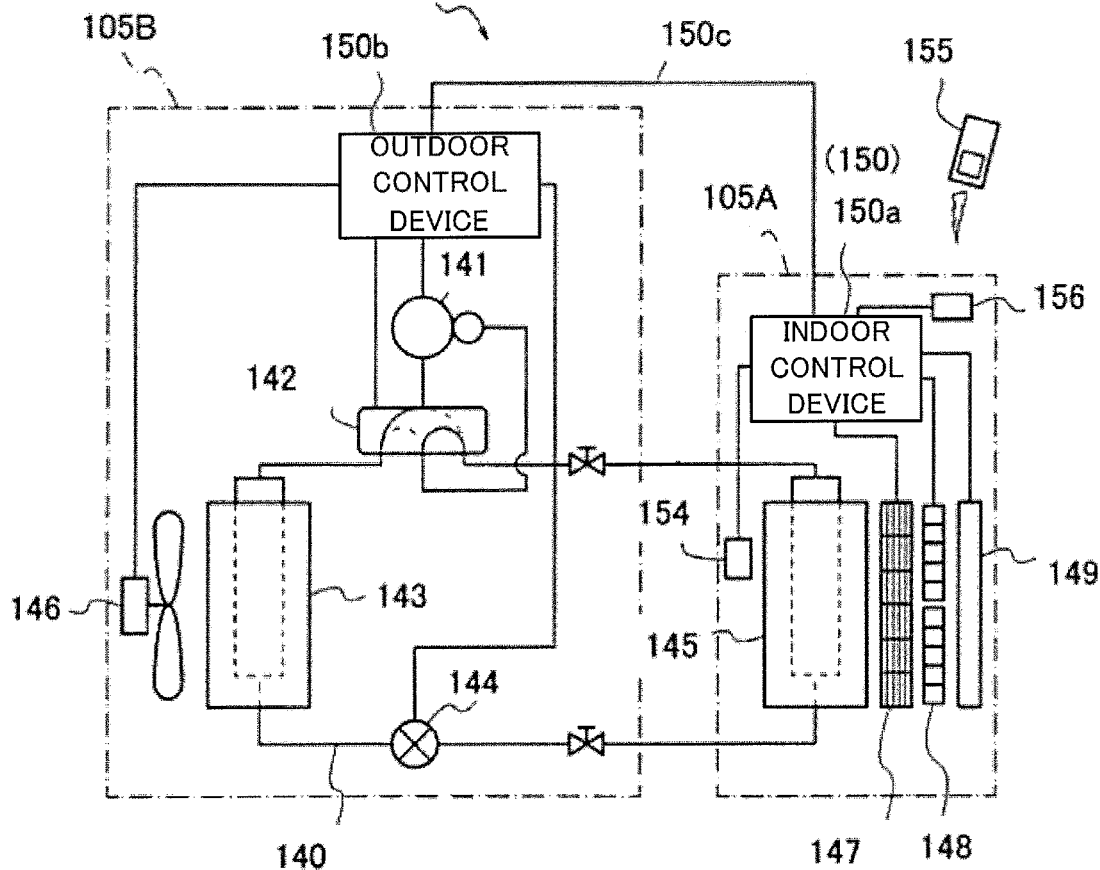
FIG. 15 is a block diagram showing a configuration of an air conditioner according to a third embodiment of the present invention.

An air conditioner including the motor driving device according to the first or second embodiment will be described below. FIG. 15 is a block diagram showing a configuration of an air conditioner 105 according to a third embodiment of the present invention. The air conditioner 105 includes an indoor unit 105A that is installed in a room (in a cooling/heating object space) and an outdoor unit 105B that is installed outdoors. The indoor unit 105A and the outdoor unit 105B are connected together by connection piping 140 in which a refrigerant flows.

The outdoor unit 105B includes a compressor 141 that compresses the refrigerant and discharges the compressed refrigerant, a four-way valve (refrigerant channel selector valve) 142 that switches the flow direction of the refrigerant, an outdoor heat exchanger 143 that performs heat exchange between outside air and the refrigerant, and an expansion valve (decompression device) 144 that decompresses the high-pressure refrigerant into low pressure. The compressor 141 is formed with a rotary compressor, for example. The indoor unit 105A includes an indoor heat exchanger 145 that performs heat exchange between indoor air and the refrigerant.

The compressor 141, the four-way valve 142, the outdoor heat exchanger 143, the expansion valve 144 and the indoor heat exchanger 145 are connected together by the piping 140 to form a refrigerant circuit. With these components, a compression refrigeration cycle (compression heat pump cycle) circulating the refrigerant with the compressor 141 is formed.

To control the operation of the air conditioner 105, an indoor control device 150a is arranged in the indoor unit 105A and an outdoor control device 150b is arranged in the outdoor unit 105B. Each of the indoor control device 150a and the outdoor control device 150b includes a control board on which various circuits for controlling the air conditioner 105 have been formed. The indoor control device 150a and the outdoor control device 150b are connected to each other by a communication cable 150c.

In the outdoor unit 105B, an outdoor blower fan 146 as a blower is arranged to face the outdoor heat exchanger 143. The outdoor blower fan 146 rotates and thereby generates an air flow passing through the outdoor heat exchanger 143. The outdoor blower fan 146 is formed with a propeller fan, for example. The outdoor heat exchanger 143 is arranged in the air blow direction (direction of the air flow) of the outdoor blower fan 146.

The four-way valve 142 is controlled by the outdoor control device 150b and switches the direction in which the refrigerant flows. When the four-way valve 142 is at the position indicated by the solid line in FIG. 15, the gas refrigerant discharged from the compressor 141 is sent to the outdoor heat exchanger 143. In contrast, when the four-way valve 142 is at the position indicated by the broken line in FIG. 15, the gas refrigerant discharged from the compressor 141 is sent to the indoor heat exchanger 145. The expansion valve 144 is controlled by the outdoor control device 150b and decompresses the high-pressure refrigerant into low pressure by changing its opening degree.

In the indoor unit 105A, an indoor blower fan 147 as a blower is arranged to face the indoor heat exchanger 145. The indoor blower fan 147 rotates and thereby generates an air flow passing through the indoor heat exchanger 145. The indoor blower fan 147 is formed with a cross flow fan, for example. The indoor blower fan 147 is arranged on the downstream side of the indoor heat exchanger 145 in its air blow direction.

The indoor unit 105A is provided with an indoor temperature sensor 154 as a temperature sensor that measures an indoor temperature Ta as an air temperature in the room (a temperature of the cooling/heating object) and sends temperature information (information signal) obtained by the measurement to the indoor control device 150a. The indoor temperature sensor 154 may be formed with a temperature sensor used for standard air conditioners, or it is also possible to use a radiation temperature sensor that detects a surface temperature of a wall, floor or the like in the room.

The indoor unit 105A is further provided with a signal reception unit 156 that receives a command signal transmitted from a user operation unit operated by the user such as a remote control 155. With the remote control 155, the user makes operation inputs (operation start and stoppage) or issues commands in regard to the operation (a set temperature, a wind speed, etc.) to the air conditioner 105.

The compressor 141 is driven by the motor 2 described in the first or second embodiment. The motor 2 is generally formed integrally with a compression mechanism of the compressor 141. The compressor 141 is configured to be able to vary the operating revolution speed in a range of 20 rps to 120 rps in normal operation. With the increase in the revolution speed of the compressor 141, refrigerant circulation volume of the refrigerant circuit increases. The revolution speed of the compressor 141 is controlled by the outdoor control device 150b based on a temperature difference $\Delta T$ between the present indoor temperature Ta obtained by the indoor temperature sensor 154 and the set temperature Ts set by the user through the remote control 155. With the increase in the temperature difference $\Delta T$, the compressor 141 rotates at higher speed and increases the circulation volume of the refrigerant.

The rotation of the indoor blower fan 147 is controlled by the indoor control device 150a. The revolution speed of the indoor blower fan 147 can be switched in multiple steps (e.g., three steps of "high", "middle" and "low"). When the wind speed setting has been set at an automatic mode by using the remote control 155, the revolution speed of the indoor blower fan 147 is switched based on the temperature difference $\Delta T$ between the measured indoor temperature Ta and the set temperature Ts.

The rotation of the outdoor blower fan 146 is controlled by the outdoor control device 150b. The revolution speed of the outdoor blower fan 146 can be switched in multiple steps. For example, the revolution speed of the outdoor blower fan 146 is switched based on the temperature difference $\Delta T$ between the measured indoor temperature Ta and the set temperature Ts. The indoor unit 105A further includes a horizontal wind direction plate 148 and a vertical wind direction plate 149.

The basic operation of the air conditioner 105 is as follows: In the cooling operation, the four-way valve 142 is switched to the position indicated by the solid line and the high-temperature and high-pressure gas refrigerant discharged from the compressor 141 flows into the outdoor heat exchanger 143. In this case, the outdoor heat exchanger 143 operates as a condenser. When air passes through the outdoor heat exchanger 143 due to the rotation of the outdoor blower fan 146, the air absorbs condensation heat of the refrigerant by means of heat exchange. The refrigerant is condensed into a high-pressure and low-temperature liquid refrigerant and then adiabatically expanded by the expansion valve 144 into a low-pressure and low-temperature two-phase refrigerant.

The refrigerant that passed through the expansion valve 144 flows into the indoor heat exchanger 145 of the indoor unit 5A. The indoor heat exchanger 145 operates as an evaporator. When air passes through the indoor heat exchanger 145 due to the rotation of the indoor blower fan 147, the refrigerant absorbs evaporation heat and evaporates by means of heat exchange, and the air cooled down by the heat exchange is supplied to the inside of the room. The refrigerant evaporates into a low-temperature and low-pressure gas refrigerant and is then compressed again by the compressor 141 into the high-temperature and high-pressure refrigerant.

In the heating operation, the four-way valve 142 is switched to the position indicated by the dotted line and the high-temperature and high-pressure gas refrigerant discharged from the compressor 141 flows into the indoor heat exchanger 145. In this case, the indoor heat exchanger 145 operates as a condenser. When air passes through the indoor heat exchanger 145 due to the rotation of the indoor blower fan 147, the air absorbs condensation heat of the refrigerant by means of heat exchange. By this operation, the heated air is supplied to the inside of the room. The refrigerant is condensed into a high-pressure and low-temperature liquid refrigerant and then adiabatically expanded by the expansion valve 144 into a low-pressure and low-temperature two-phase refrigerant.

The refrigerant that passed through the expansion valve 144 flows into the outdoor heat exchanger 143 of the outdoor unit 105B. The outdoor heat exchanger 143 operates as an evaporator. When air passes through the outdoor heat exchanger 143 due to the rotation of the outdoor blower fan 146, the refrigerant absorbs evaporation heat and evaporates by means of heat exchange. The refrigerant evaporates into a low-temperature and low-pressure gas refrigerant and then compressed again by the compressor 141 into the high-temperature and high-pressure refrigerant.

The indoor control device 150a and the outdoor control device 150b control the air conditioner 105 while exchanging information with each other via the communication cable 150c. The indoor control device 150a and the outdoor control device 150b will hereinafter be referred to collectively as a control device 150. The control device 150 corresponds to the control units 6 and 7 in the first and second embodiments.

Figure 16:
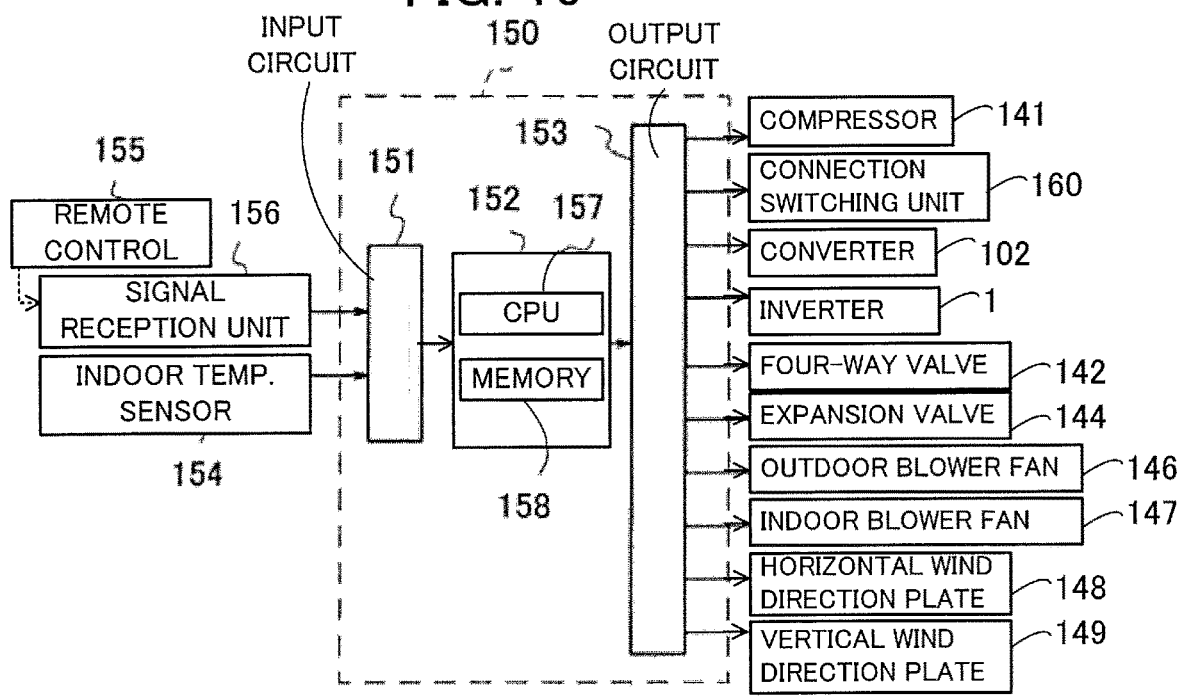
FIG. 16 is a block diagram showing a control system of the air conditioner according to the third embodiment.

FIG. 16 is a block diagram showing a control system of the air conditioner 105. The control device 150 is formed with a microcomputer, for example. An input circuit 151, an arithmetic circuit 152 and an output circuit 153 have been installed in the control device 150.

To the input circuit 151, the command signal received by the signal reception unit 156 from the remote control 155 is inputted. The command signal includes a signal for setting an operation input, an operation mode, the set temperature, an air flow rate or a wind direction, for example. The temperature information indicating the indoor temperature detected by the indoor temperature sensor 154 is also inputted to the input circuit 151. The input circuit 151 outputs these pieces of input information to the arithmetic circuit 152.

The arithmetic circuit 152 includes a CPU (Central Processing Unit) 157 and a memory 158. The CPU 157 performs arithmetic processing and judgment processing. The memory 158 stores various types of set values and programs to be used for the control of the air conditioner 105. The arithmetic circuit 152 performs computation and judgment based on the information inputted from the input circuit 151 and outputs the result to the output circuit 153.

The output circuit 153 outputs control signals to the compressor 141, a connection switching unit 160, the converter 102, the inverter 1, the four-way valve 142, the expansion valve 144, the outdoor blower fan 146, the indoor blower fan 147, the horizontal wind direction plate 148 and the vertical wind direction plate 149 based on the information inputted from the arithmetic circuit 152. The connection switching unit 160 is the connection switching unit 3 in the first embodiment or the connection switching unit 4 in the second embodiment.

The control device 150 controls various types of devices in the indoor unit 105A and the outdoor unit 105B. Actually, each of the indoor control device 150a and the outdoor control device 150b is formed with a microcomputer. Incidentally, it is also possible to install the control device in only one of the indoor unit 105A and the outdoor unit 105B to control the various types of devices in the indoor unit 105A and the outdoor unit 105B.

The arithmetic circuit 152 analyzes the command signal inputted from the remote control 155 via the input circuit 151 and figures out, for example, the operation mode and the temperature difference $\Delta T$ between the set temperature Ts and the indoor temperature Ta based on the result of the analysis. When the operation mode is the cooling operation, the temperature difference $\Delta T$ is calculated as $\Delta T=Ta-Ts$. When the operation mode is the heating operation, the temperature difference $\Delta T$ is calculated as $\Delta T=Ts-Ta$.

The arithmetic circuit 152 controls the driving device 100 based on the temperature difference $\Delta T$ and thereby controls the revolution speed of the motor 2 (namely, the revolution speed of the compressor 141).

Next, the operation of the air conditioner will be described. The basic operation of the air conditioner 105 is as described below. When the operation is started, the control device 150 starts up in the delta connection that is the connection at the end of the previous operation. The control device 150 drives fan motors of the indoor blower fan 147 and the outdoor blower fan 146 as a startup process of the air conditioner 105.

Subsequently, the control device 150 outputs a voltage switching signal to the converter 102 supplying the DC voltage (bus voltage) to the inverter 1 and thereby raises the bus voltage of the converter 102 to a bus voltage corresponding to the delta connection (e.g., 390 V). Further, the control device 150 starts up the motor 2.

Subsequently, the control device 150 performs the driving of the motor 2 in the delta connection. Specifically, the control device 150 controls the output voltage of the inverter 1 and thereby controls the revolution speed of the motor 2. Further, the control device 150 acquires the temperature difference $\Delta T$ between the indoor temperature detected by the indoor temperature sensor 154 and the set temperature set through the remote control 155 and raises the revolution speed depending on the temperature difference $\Delta T$ up to an allowable maximum revolution speed at the maximum (130 rps in this example). By this operation, the refrigerant circulation volume of the compressor 141 is increased, the cooling capacity is raised in the case of the cooling operation, and the heating capacity is raised in the case of the heating operation.

When the indoor temperature approaches the set temperature due to the air conditioning effect and the temperature difference $\Delta T$ shows a tendency to decrease, the control device 150 decreases the revolution speed of the motor 2 depending on the temperature difference $\Delta T$. When the temperature difference $\Delta T$ decreases to a predetermined near-zero temperature (greater than 0), the control device 150 operates the motor 2 at an allowable minimum revolution speed (20 rps in this example).

When the indoor temperature reaches the set temperature (namely, when the temperature difference $\Delta T$ decreases to 0 or less), the control device 150 stops the rotation of the motor 2 to avoid excessive cooling (or excessive heating). Accordingly, the compressor 141 shifts to the stopped state. Thereafter, when the temperature difference $\Delta T$ is greater than 0 again, the control device 150 restarts the rotation of the motor 2.

Further, the control device 150 judges whether the switching of the stator windings from the delta connection to the star connection is necessary or not. Specifically, the control device 150 judges whether or not the connection condition of the stator windings is the delta connection and the aforementioned temperature difference $\Delta T$ is less than or equal to a threshold value $\Delta Tr$. The threshold value $\Delta Tr$ is a temperature difference corresponding to an air conditioning load that is low to the extent that the switching to the star connection is possible.

The switching from the delta connection to the star connection is made depending on the result of the comparison. If the connection condition of the stator windings is the delta connection and the temperature difference ΔT is less than or equal to the threshold value ΔTr, the control device 150 outputs a stop signal to the inverter 1 and thereby stops the rotation of the motor 2. Thereafter, the control device 150 outputs a connection switching signal to the connection switching unit 160 and thereby switches the connection condition of the stator windings from the delta connection to the star connection. Subsequently, the control device 150 outputs a voltage switching signal to the converter 102, thereby lowers the bus voltage of the converter 102 to a voltage corresponding to the star connection (e.g., 280 V), and restarts the rotation of the motor 2.

In the operation in the star connection, when the temperature difference ΔT is greater than the threshold value ΔTr, the control device 150 stops the rotation of the motor 2. Thereafter, the control device 150 outputs a connection switching signal to the connection switching unit 160 and thereby switches the connection condition of the stator windings from the star connection to the delta connection. Subsequently, the control device 150 outputs a voltage switching signal to the converter 102, thereby raises the bus voltage of the converter 102 to the voltage corresponding to the delta connection (e.g., 390 V), and restarts the rotation of the motor 2.

With the delta connection, the motor 2 can be driven to higher revolution speed compared with the star connection and that makes it possible to deal with higher loads. Accordingly, the temperature difference ΔT between the indoor temperature and the set temperature can be converged in a short time.

The control device 150 stops the rotation of the motor 2 when an operation stop signal is received. Thereafter, the control device 150 switches the connection condition of the stator windings from the star connection to the delta connection. Incidentally, when the connection condition of the stator windings is already the delta connection, the connection condition is maintained.

Thereafter, the control device 150 performs a stoppage process of the air conditioner 105. Specifically, the control device 150 stops the fan motors of the indoor blower fan 147 and the outdoor blower fan 146. Thereafter, the CPU 157 of the control device 150 stops and the operation of the air conditioner 105 ends.

As above, the motor 2 is operated in the star connection of high efficiency when the temperature difference ΔT between the indoor temperature and the set temperature is relatively small (namely, less than or equal to the threshold value ΔTr). When it is necessary to deal with a higher load, namely, when the temperature difference ΔT is greater than the threshold value ΔTr, the motor 2 is operated in the delta connection capable of dealing with higher loads. Accordingly, operating efficiency of the air conditioner 105 can be increased.

Incidentally, when switching from the star connection to the delta connection, it is also possible to detect the revolution speed of the motor 2 before stopping the rotation of the motor 2 and make a judgment on whether or not the detected revolution speed is higher than or equal to a threshold value. As the threshold value for the revolution speed of the motor 2, 60 rps as the midpoint between a revolution speed 35 rps corresponding to a heating intermediate condition and a revolution speed 85 rps corresponding to a heating rated condition is used, for example. If the revolution speed of the motor 2 is higher than or equal to the threshold value, the rotation of the motor 2 is stopped, the switching to the delta connection is made, and the bus voltage of the converter 102 is raised.

By making the connection switching necessity judgment based on the revolution speed of the motor 2 as above in addition to the connection switching necessity judgment based on the temperature difference ΔT, more reliable connection switching can be carried out.

Figure 17:
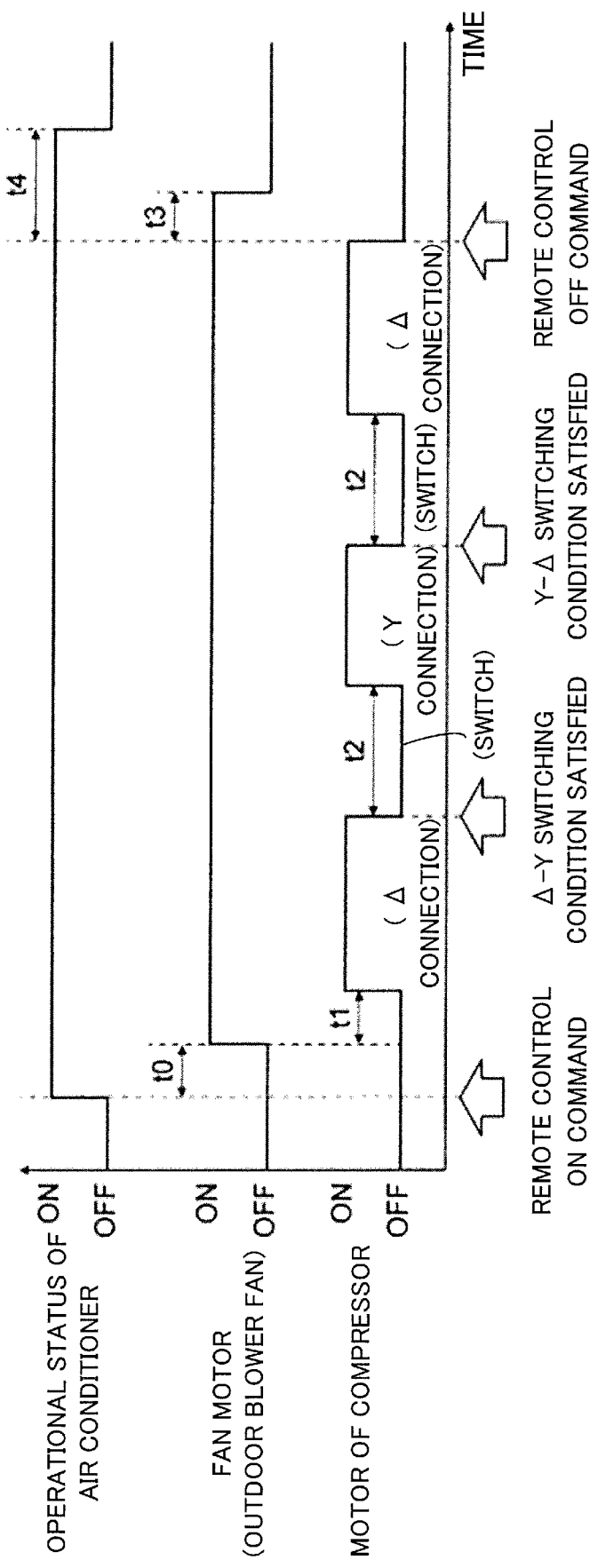
FIG. 17 is a timing chart showing an example of operation of the air conditioner according to the third embodiment.

FIG. 17 is a timing chart showing an example of the operation of the air conditioner 105. FIG. 17 shows operational status of the air conditioner 105 and drive status of the outdoor blower fan 146 and the motor 2 (compressor 141). The outdoor blower fan 146 is shown as an example of a component of the air conditioner 105 other than the motor 2.

In response to an operation startup signal (ON command) received by the signal reception unit 156 from the remote control 155, the CPU 157 starts up and the air conditioner 105 shifts to a startup state (ON state). When the air conditioner 105 shifts to the startup state, the fan motor of the outdoor blower fan 146 starts rotating after the elapse of a time t0. The time t0 is a delay time due to the communication between the indoor unit 105A and the outdoor unit 105B.

Thereafter, the rotation of the motor 2 with the delta connection is started after the elapse of a time t1. The time t1 is a waiting time until the rotation of the fan motor of the outdoor blower fan 146 stabilizes. By rotating the outdoor blower fan 146 before starting the rotation of the motor 2, an excessive rise in the temperature of the refrigeration cycle is prevented.

In the example of FIG. 17, the switching from the delta connection to the star connection is made, the switching from the star connection to the delta connection is also made, and the operation stop signal (OFF command) is received from the remote control 155. The time t2 necessary for the connection switching, as a waiting time necessary for the restart of the motor 2, is set at a time necessary for the refrigerant pressure in the refrigeration cycle to become approximately uniform.

Upon receiving the operation stop signal from the remote control 155, the rotation of the motor 2 stops, and the rotation of the fan motor of the outdoor blower fan 146 stops after the elapse of a time t3. The time t3 is a waiting time necessary for sufficiently lowering the temperature of the refrigeration cycle. After the elapse of a time t4, the CPU 157 stops and the air conditioner 105 shifts to an operation stop state (OFF state). The time t4 is a previously set waiting time.

In the air conditioner 105 according to the third embodiment, the connection switching unit 3 or 4 of the motor driving device in the first or second embodiment can be used as the connection switching unit 160. Therefore, the connection condition of the stator windings can be switched appropriately by switching the states of the switch movable parts 31*e* to 33*e* or 41*e* to 46*e* of the relays 31 to 33 or 41 to 46 as the mechanical switches included in the connection switching unit 3 or 4 through the excitation or non-excitation of the excitation coils 51*a* to 53*a* or 61*a* to 66*a*. Accordingly, the motor 2 can be driven in high speed rotation with the delta connection, and the motor 2 can be driven with high efficiency in low speed rotation with the star connection.

Further, with the air conditioner 105 according to the third embodiment, the electric power consumption can be reduced since the excitation (energization) of the excitation coils 51*a* to 53*a* or 61*a* to 66*a* is unnecessary in low speed rotation whose operating time is supposed to be long.

Incidentally, the air conditioning operation and the conditions for the switching of the connection condition described above are just an example; the conditions for the switching between the star connection and the delta connection may be determined based on various conditions such as the motor revolution speed, the motor current and a modulation factor or a combination of various conditions, for example.

What is claimed is:

1. An air conditioner comprising:
a motor including stator windings;
a compressor driven by the motor; and
a motor driving device that drives the motor, wherein:
the motor driving device includes:
   a connection switching unit that includes a mechanical switch connected to the stator windings and an excitation coil opening or closing the mechanical switch by being energized or non-energized with excitation current and switches a connection condition of the stator windings to either of a star connection condition and a delta connection condition by opening or closing the mechanical switch; and
   an inverter that supplies AC drive voltages to the stator windings,
the stator windings include a first open winding, a second open winding, and a third open winding,
the first open winding has a first winding terminal connected to the inverter and a second winding terminal connected to the connection switching unit,
the second open winding has a third winding terminal connected to the inverter and a fourth winding terminal connected to the connection switching unit,
the third open winding has a fifth winding terminal connected to the inverter and a sixth winding terminal connected to the connection switching unit,
the air conditioner raises a revolution speed of the motor depending on an increase in a temperature difference between an indoor temperature and a set temperature when the connection condition of the stator windings is the delta connection, and
the connection switching unit
   switches the connection condition of the stator windings to the star connection by connecting the second winding terminal of the first open winding, the fourth winding terminal of the second open winding, and the sixth winding terminal of the third open winding together when the temperature difference is less than or equal to a threshold value and the excitation coil is not energized with the excitation current, and
   switches the connection condition of the stator windings to the delta connection by connecting the second winding terminal of the first open winding, the fourth winding terminal of the second open winding and the sixth winding terminal of the third open winding to the inverter when the temperature difference is greater than the threshold value and the excitation coil is energized with the excitation current.

2. The air conditioner according to claim 1, wherein:
the mechanical switch includes a first relay, a second relay and a third relay,
the first relay has a first terminal connected to the inverter, a second terminal, and a third terminal connected to the second winding terminal of the first open winding and connected to one of the first terminal and the second terminal,
the second relay has a fourth terminal connected to the inverter, a fifth terminal connected to the second terminal, and a sixth terminal connected to the fourth winding terminal of the second open winding and connected to one of the fourth terminal and the fifth terminal,
the third relay has a seventh terminal connected to the inverter, an eighth terminal connected to the second terminal and the fifth terminal, and a ninth terminal connected to the sixth winding terminal of the third open winding and connected to one of the seventh terminal and the eighth terminal, and
the connection switching unit switches the connection condition of the stator windings to the star connection condition by
   connecting the second terminal and the third terminal together,
   connecting the fifth terminal and the sixth terminal together, and
   connecting the eighth terminal and the ninth terminal together.

3. The air conditioner according to claim 2, wherein
the connection switching unit switches the connection condition to the delta connection condition by
   connecting the first terminal and the third terminal together,
   connecting the fourth terminal and the sixth terminal together, and
   connecting the seventh terminal and the ninth terminal together.

4. The motor driving device according to claim 1, wherein:
the mechanical switch includes a first relay, a second relay, a third relay, a fourth relay, a fifth relay and a sixth relay,
the first relay has a first terminal connected to the inverter and a second terminal connected to the second winding terminal of the first open winding,
the second relay has a third terminal and a fourth terminal connected to the second winding terminal of the first open winding,
the third relay has a fifth terminal connected to the inverter and a sixth terminal connected to the fourth winding terminal of the second open winding,
the fourth relay has a seventh terminal connected to the third terminal and an eighth terminal connected to the fourth winding terminal of the second open winding,
the fifth relay has a ninth terminal connected to the inverter and a tenth terminal connected to the sixth winding terminal of the third open winding,
the sixth relay has an eleventh terminal connected to the third terminal and the seventh terminal and a twelfth terminal connected to the sixth winding terminal of the third open winding, and
the connection switching unit switches the connection condition of the stator windings to the star connection condition by
   setting the first terminal and the second terminal in an open state,
   setting the fifth terminal and the sixth terminal in the open state,
   setting the ninth terminal and the tenth terminal in the open state,
   setting the third terminal and the fourth terminal in a closed state,
   setting the seventh terminal and the eighth terminal in the closed state, and
   setting the eleventh terminal and the twelfth terminal in the closed state.

5. The air conditioner according to claim 4, wherein
the connection switching unit switches the connection condition of the stator windings to the delta connection condition by
setting the first terminal and the second terminal in the closed state,
setting the fifth terminal and the sixth terminal in the closed state,
setting the ninth terminal and the tenth terminal in the closed state,
setting the third terminal and the fourth terminal in the open state,
setting the seventh terminal and the eighth terminal in the open state, and
setting the eleventh terminal and the twelfth terminal in the open state.

6. The air conditioner according to claim 1, further comprising
a control unit that controls the connection switching unit and the inverter, wherein
the control unit makes the connection switching unit performs the switching of the connection condition while the driving of the motor is stopped.

7. The air conditioner according to claim 6, wherein
the control unit makes the connection switching unit switch the connection condition to the delta connection condition before startup of the motor.

* * * * *